(12) United States Patent
Saito et al.

(10) Patent No.: US 9,202,647 B2
(45) Date of Patent: *Dec. 1, 2015

(54) SWITCHING CONTROLLER AND SWITCHING CONTROL SYSTEM FOR CIRCUIT BREAKER

(75) Inventors: Minoru Saito, Kamakura (JP); Hiroyuki Maehara, Fuchu (JP); Yoshimasa Sato, Nakahara-ku (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 633 days.

This patent is subject to a terminal disclaimer.

(21) Appl. No.: 13/275,743

(22) Filed: Oct. 18, 2011

(65) Prior Publication Data

US 2012/0050937 A1   Mar. 1, 2012

Related U.S. Application Data

(63) Continuation of application No. 12/608,444, filed on Oct. 29, 2009, now abandoned.

(30) Foreign Application Priority Data

Oct. 31, 2008   (JP) ................................. 2008-281829

(51) Int. Cl.
*H01H 47/32* (2006.01)
*H01H 9/56* (2006.01)

(52) U.S. Cl.
CPC ........... *H01H 9/563* (2013.01); *H01H 2300/03* (2013.01); *Y02B 70/3241* (2013.01); *Y02B 90/224* (2013.01); *Y04S 20/14* (2013.01); *Y04S 20/227* (2013.01)

(58) Field of Classification Search
USPC ............. 307/11–87, 139, 140, 141, 160, 195; 361/139, 160, 195
See application file for complete search history.

(56) References Cited

U.S. PATENT DOCUMENTS 5,513,061 A * 4/1996 Gelbien et al. .................. 361/63
5,563,459 A   10/1996 Kurosawa et al.
(Continued)

FOREIGN PATENT DOCUMENTS

JP   3-156820   7/1991
JP   10-254558   9/1998
(Continued)

OTHER PUBLICATIONS

"Microprocessor based controllers for point-on-wave switching of ABB circuit breakers for transient reduction and improved power quality", Catalogue Publication 1HSM 9543 22-01en, Controlled Switching Buyer's Guide, Edition 1, May 2004, ABB Power technologies, 52 pages.

(Continued)

*Primary Examiner* — Rexford Barnie
*Assistant Examiner* — Daniel Kessie
(74) *Attorney, Agent, or Firm* — Oblon, McClelland, Maier & Neustadt, L.L.P.

(57) ABSTRACT

A switching controller for circuit breaker in which a switching control arithmetic operation unit performs arithmetic operations to determine for each circuit breaker a synchronous delay count value which is sent to each switching command control unit of the corresponding circuit breaker, which upon receiving a switching command signal from a superordinate device, counts the synchronous delay count value D, to turn on a semiconductor switch of the switching command output unit after counting completes. The switching command signal (circuit breaker drive current) is output after the synchronous switching control to the circuit breaker drive coil of the circuit breaker. The switching controller can implement cost saving and space saving, even if switching of a circuit breaker in a lower branch system, such as a power distribution system, is controlled.

7 Claims, 12 Drawing Sheets

(56) References Cited

U.S. PATENT DOCUMENTS

| | | | |
|---|---|---|---|
| 5,684,710 A * | 11/1997 | Ehlers et al. | 700/293 |
| 5,838,077 A | 11/1998 | Chelcun et al. | |
| 6,064,001 A * | 5/2000 | Ulerich et al. | 174/50 |
| 6,075,296 A * | 6/2000 | Kasbergen | 307/139 |
| 6,172,863 B1 * | 1/2001 | Ito et al. | 361/79 |
| 6,954,704 B2 | 10/2005 | Minami et al. | |
| 7,560,834 B2 * | 7/2009 | Joho | 307/127 |
| 7,711,502 B2 * | 5/2010 | Koyama et al. | 702/60 |
| 7,787,228 B2 * | 8/2010 | Koyama et al. | 361/78 |
| 8,018,097 B2 | 9/2011 | Saito et al. | |
| 8,362,744 B2 * | 1/2013 | Terao et al. | 320/108 |
| 2003/0205938 A1 * | 11/2003 | Andarawis et al. | 307/11 |
| 2008/0258558 A1 * | 10/2008 | Lathrop et al. | 307/29 |
| 2010/0200383 A1 | 8/2010 | Saito | |

FOREIGN PATENT DOCUMENTS

| | | |
|---|---|---|
| JP | 2000-188044 | 7/2000 |
| JP | 2004-72905 A | 3/2004 |
| JP | 2008-78079 A | 4/2008 |
| JP | 2008-92671 A | 4/2008 |
| JP | 2008-135246 | 6/2008 |

OTHER PUBLICATIONS

Japanese Office Action issued Dec. 25, 2012 in Patent Application No. 2008-281829.

Extended European Search Report issued May 14, 2013, in European Patent Application No. 09013694.6.

Search and Examination report mailed Jun. 7, 2015 in Korean Application No. UAE/P/ 0960/2009

* cited by examiner

SWITCHING CONTROLLER AND SWITCHING CONTROL SYSTEM FOR CIRCUIT BREAKER

CROSS-RELATION TO RELATED APPLICATION

This application is a Continuation of U.S. application Ser. No. 12/608,444 filed Oct. 29, 2009, the entire contents of which are incorporated herein by reference. This application is based upon and claims the benefit of priority from the prior Japanese Patent Application No. 2008-281829 filed Oct. 31, 2008.

BACKGROUND OF THE INVENTION

1. Field of the Invention

The present invention relates to a technology to control switching of a circuit breaker, and more particularly to a switching controller for circuit breaker of which switching can be controlled, without increasing cost and installation space, even if the circuit breaker is in a lower branch system.

2. Description of the Related Art

In a device for controlling switching of a power circuit breaker, a method for controlling the opening/closing timing of the circuit breaker, so as not to generate transient phenomena in a system and power apparatus, has been proposed (e.g. see Patent Document 1). In the power switching controller according to prior art disclosed in Patent Document 1, the object is to prevent the generation of transient phenomena, which negatively influences the system and apparatus, under any switching conditions of the circuit breaker.

In addition to this prior art, a device for controlling the opening timing of the circuit breaker, so that the circuit breaker contact can have sufficient opening length when current is interrupted, has been proposed in order to avoid generating transient phenomena. A device for controlling the closing timing of the contact of the circuit breaker, in particular for controlling the closing timing according to the type of load, has also been proposed.

Such a switching controller for circuit breaker has a function to delay the output timing of an opening command signal or a closing command signal to the circuit breaker, to open or close the circuit breaker in a desired phase when the opening command signal or closing command signal has been detected. Because of this function, many switching controllers for circuit breaker, for not generating transient phenomena in the system or power apparatus, are now frequently used in actual power stations (e.g. see Non-Patent Document 1). This kind of switching control for a circuit breaker is called "synchronous opening control" or "synchronous closing control".

Patent Document 1: Japanese Patent Application Laid-Open No. H3-156820
Non-Patent Document 1: Catalogue Publication 1HSM 9543 22-01en, Controlled Switching Buyer's Guide, Edition 1, 2004-05, ABB Power Technologies In the case of prior art shown in Patent Document 1 and Non-Patent Document 1, one switching controller for circuit breaker must be used for one circuit breaker (one circuit breaker in this description refers to a circuit breaker for 3 phases, and hereafter in a case of using a single-phase operation-type circuit breaker, a 3-phase-1-set circuit breaker is regarded as one circuit breaker).

In a case of using the switching controller for a circuit breaker in a trunk power system, such as a 500 kV system, the ratio of the cost of the switching controller for circuit breaker is generally small compared with the cost of the circuit breaker itself. Therefore, in terms of cost, using one switching controller for one circuit breaker, like the case of the prior art, is not a major problem.

However if the switching controller for circuit breaker is used for a circuit breaker in a lower branch system, such as a power distribution system, using one switching controller for one circuit breaker, often causes a cost problem. Also in a power station in a lower branch system, such as a power distribution system, the installation space for a circuit breaker is often limited, so installing switching controllers of the same number as that of the circuit breakers is difficult.

In terms of maintenance of the switching controller for circuit breaker, a switching controller for circuit breaker used for many electric stations has a connection unit with such external equipment as a personal computer, and has a function to acquire various data when the switching of the circuit breaker has been controlled, including main circuit current waveforms and system voltage waveforms. Here, in order to connect the synchronous switching controller for the circuit breaker with such external equipment as a personal computer in the switching controller for circuit breaker, so as to acquire various data, normally dedicated communication software and maintenance software must be installed in the personal computer.

In the case of the switching controller for circuit breaker according to Non-Patent Document 1, for example, dedicated communication software and maintenance software are provided to the user on a CD-ROM, and the user must install the dedicated software in the personal computer using this CD-ROM. As a result of using this prior art, a personal computer in which the dedicated software is not installed cannot be connected to the switching controller for circuit breaker, which is very inconvenient to use in terms of storage and management of various acquired data.

Also in the case of the switching controller for circuit breaker according to Non-Patent Document 1, an RS-232C interface is used to connect with the personal computer, which is based on the local connection at the work site, and is inconvenient for remote control. If remote control is required, a modem must be connected to the personal computer so as to be connected with the switching controller for circuit breaker via a telephone line, which is not only inconvenient to use but also communication speed is slow and operation is inefficient.

Another problem is that only one switching controller for circuit breaker can be connected to one personal computer, which means that in order to perform maintenance and acquire various data for switching controllers for circuit breaker installed in a plurality of circuits, a connection switching operation is generated, and the operation efficiency deteriorates.

SUMMARY OF THE INVENTION

The present invention is proposed for solving the above mentioned problems, and an object is to provide a switching controller for circuit breaker and a switching control system for circuit breaker that can implement cost saving and space saving, even if switching of a circuit breaker in a lower branch system, such as a power distribution system, is controlled. Another object is to provide a switching controller for circuit breaker and a switching control system for circuit breaker which can be easily connected with such external equipment as a personal computer without using dedicated software at the work site or from a remote place, and can perform efficient maintenance and data collection.

The present invention is a switching controller for circuit breaker to which at least one of the electrical quantities of the system voltage and main circuit current, state quantity of each circuit breaker, and at least one of an opening command signal and a closing command signal of each circuit breaker are input, and which controls the opening command signal to open the circuit breaker or the closing command signal to close the circuit breaker at a desired phase of the system voltage or the main circuit current, comprising: a first area which performs arithmetic operations to determine an individual synchronous closing delay time for the closing command signal, or performs arithmetic operations to determine an individual synchronous opening delay time for the opening command signal when the opening/closing command signal of each circuit breaker has been input; and a second area which controls delay of the closing command signal based on the synchronous closing delay time, or controls delay of the opening command signal based on the synchronous opening delay time when the opening/closing command signal has been determined by the first area, and outputs each of these delay-controlled opening/closing command signals to each corresponding circuit breaker.

Another aspect of the present invention further is constituted of a third area, which is a communication unit for communicating with a display operation device which displays and stores synchronous switching control related data including main circuit current waveforms and system voltage waveforms before and after the switching operation of the circuit breaker, stroke waveforms of the circuit breaker, switching operation time of the circuit breaker and state quantity of the circuit breaker.

As a result of using the present invention, one switching controller for circuit breaker can control switching for a plurality of circuit breakers, even if circuit breakers in a lower branch system, such as a power distribution system, are used, so it is unnecessary to install the switching controllers of the same number as that of many circuit breakers, and a switching controller for circuit breaker and switching control system for circuit breaker, that can save cost and save space, can be provided.

DESCRIPTION OF THE PREFERRED EMBODIMENTS

Preferred embodiments of a switching controller for circuit breaker and switching control system for circuit breaker according to the present invention will now be described with reference to FIG. 1 to FIG. 12.

1. First Embodiment

[1.1 Configuration]
[1.1.1 General Configuration]

The configuration of the entire system of a switching controller for circuit breaker and peripheral circuits thereof according to the first embodiment will be described first with reference to FIG. 1.

Figure 1:
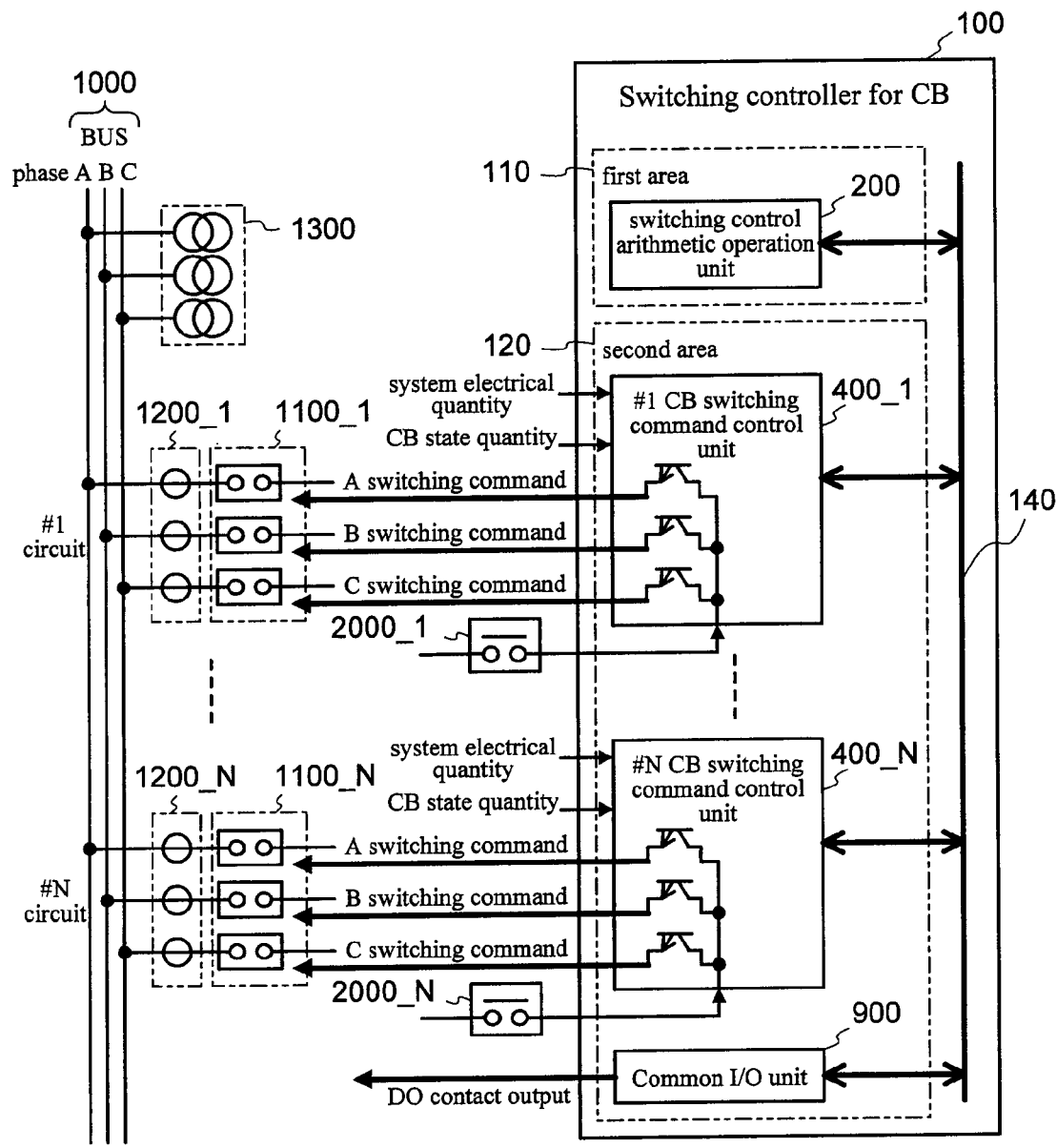
FIG. 1 is a diagram depicting a system configuration of the switching controller for circuit breaker and peripheral circuits according to the first embodiment of the present invention.

As FIG. 1 shows, 100 denotes a switching controller for circuit breaker of the present invention, and 1000 denotes a main circuit, which is constituted of a bus, power transmission circuits from circuit #1 to circuit #N, a transformer circuit and a phase modifier circuit.

1100_1 to 1100_N denote single-phase operation-type circuit breakers for 3 phases (hereafter simply circuit breaker unless otherwise specified) corresponding to circuit #1 to circuit #N, 1200_1 to 1200_N denote current transformers for 3 phases corresponding to circuit #1 to circuit #N, and 1300 denotes a voltage transformer for 3 phases connected to a bus of a main circuit 1000. Since the switching controller for circuit breaker 100 of the present invention operates and functions on the 3 phase circuit breaker 1100 and other circuits, the control target thereof is a 3-phase circuit or 3-phase circuit breaker, unless other specified. The other disconnectors and ground switch or the like are omitted in FIG. 1, but it is assumed that general apparatuses constituting a switching device of an electric station are connected to the main circuit 1000.

2000_1 to 2000_N denotes superordinate devices, such as a protective relay device and BCU (Bay Control Unit) corresponding to circuit #1 to circuit #N respectively.

Here, the suffixes _1 to _N attached to the circuit breaker 1100, current transformer 1200 and superordinate device 2000 indicate correspondence to circuit #1 to circuit #N, and this description will be omitted herein below unless necessary. "circuit" of circuit #1 to circuit #N could be any circuit in an electric station, such as a power transmission circuit, a transformer circuit and a phase modifier circuit (shunt reactor circuit, capacitor bank circuit).

Now, the major components of the switching controller for circuit breaker 100 will be described with reference to FIG. 1. The switching controller for circuit breaker 100 is constituted of a first area 110 which performs switching control arithmetic operation to open or close the circuit breaker 1100 at a desired phase of the system voltage or main circuit current from the transformer 1300 or the main circuit 1000, and a second area 120 which outputs a delay-controlled opening command signal or a delay-controlled closing command signal to the circuit breaker 1100 based on the switching control arithmetic operation result of the first area 110.

The entity of the first area 110 of the switching controller for circuit breaker 100, which will be described in detail in [1.1.2 Concrete configuration], is a switching control arithmetic operation unit 200, which is a substrate of which main components are an MPU (microprocessor) for switching control arithmetic operation and a memory. The entity of the second area 120 of the switching controller for circuit breaker 100, which will also be described in detail in [1.1.2 Concrete configuration], is N number of switching command control units 400_1 to 400_N, which are substrates of which major components are an AC input circuit, a sensor input circuit, a DI (Digital Input) circuit, and a switching command output unit, and a common input/output unit 900, which is a substrate constituted by an input/output circuit shared by each circuit, such as DO (Digital) contact output for a failure alarm.

The suffixes _1 to _N of the switching command control unit 400 corresponds to circuit breaker 1100_1 of the circuit #1 to circuit breaker 1100_N of the circuit #N respectively. In the first embodiment, the switching command control units 400_1 to 400_N are constituted by components which are independent for each circuit breaker 1100, in other words, they are constituted by N number of substrates which are independent each other for the N number of circuit breakers 1100_1 to 1100_N. Needless to say, the common input/output unit 900 may be one substrate or may be a plurality of substrates separated for each function.

The first embodiment includes a mode in which the switching command control units 400_1 to 400_N corresponding to individual circuit breakers 1100 are constituted by one substrate respectively, and a mode in which the switching command control units 400_1 to 400_N are constituted by a plurality of substrates separated for each function. In the switching command control unit 400, switching command control functions for the N number of circuit breakers 1100 may be integrated into one substrate, or the switching command control functions of several circuit breakers 1100 may be integrated into one substrate such that the switching command control unit is constituted by several substrates. In any case, the same functions can be implemented.

Concerning the connection relationship of the first area 110 and the second area 120 of the switching controller for circuit breaker 100, the first area 110 and the second area 120 are connected via a parallel transmission medium 140. Concretely, the switching control arithmetic operation unit 200 of the first area 110, and the switching command control unit 400 and the common input/output unit 900 of the second area are connected via the parallel transmission medium 140, which is an I/O (input/output) bus for mutually communicating such data as AC input, sensor input, DI (Digital Input), switching command signal and DO (Digital) contact output for failure alarm.

[1.1.2 Concrete Configuration]

Figure 2:
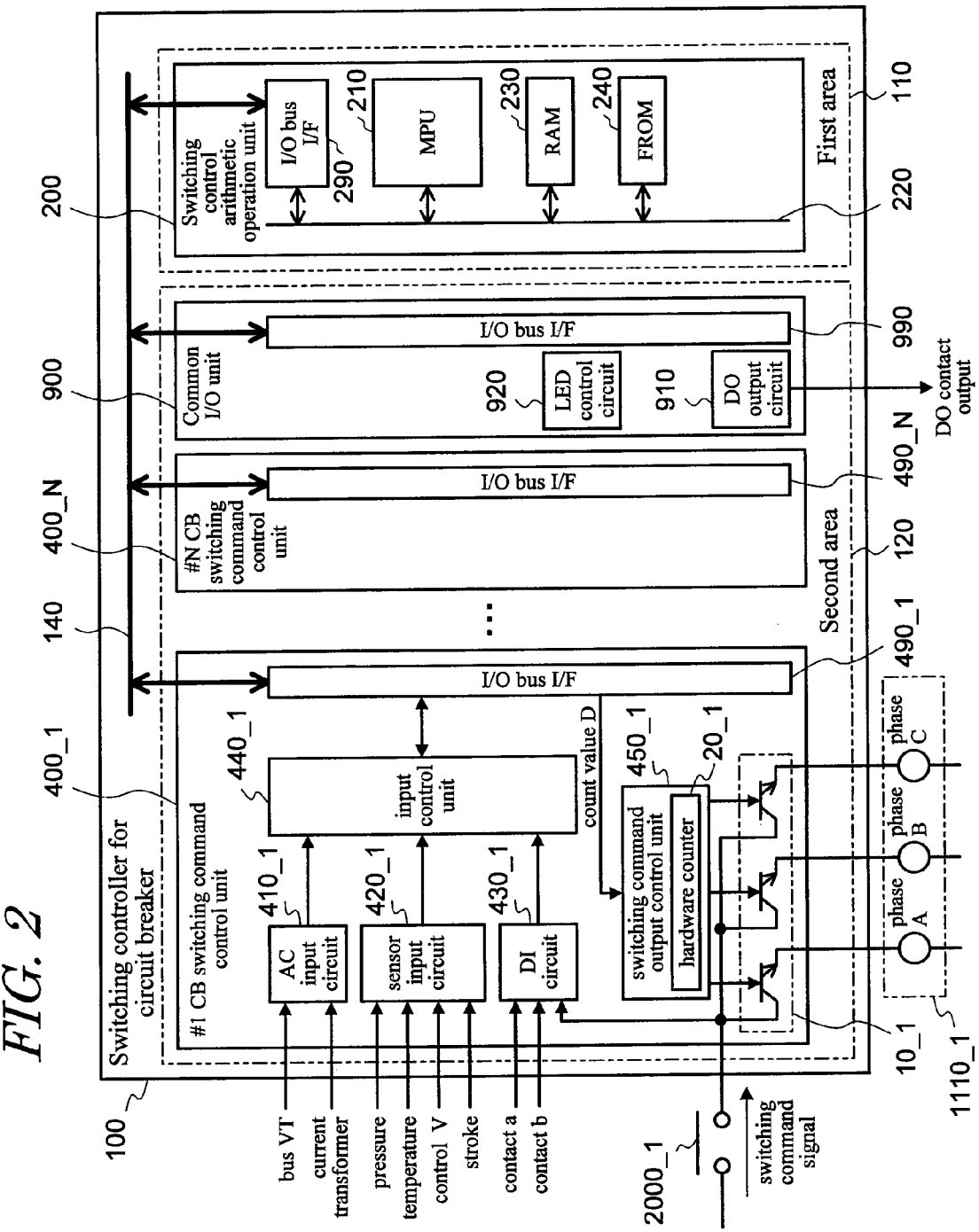
FIG. 2 is a detailed block diagram of the switching controller for circuit breaker according to the first embodiment of the present invention.

The concrete configuration of the switching controller for circuit breaker 100 according to the first embodiment will now be described with reference to FIG. 2. FIG. 2 is a detailed block diagram of the switching controller for circuit breaker 100 according to the first embodiment.

[1.1.2.1 First Area]

The switching control arithmetic operation unit 200 of the first area 110 is constituted of an MPU (microprocessor) for switching control arithmetic operation 210, a RAM 230, an FROM (Flash ROM, alternatively, a rewritable non-volatile memory such as EEPROM, can be used) 240, and an I/O bus interface (I/F) 290, which are interconnected via local bus 220.

This local bus 220 is constituted by a dedicated parallel bus for the hardware configuration in-use, or such a general purpose parallel bus as a PCI bus, compact PCI bus and VME bus. The I/O bus interface 290 is an interface of the parallel transmission medium 140, which is an I/O bus for communicating data between the first area 110 and the second area 120. Concrete control arithmetic operation of the MPU for switching control arithmetic operation 210 will be described later.

[1.1.2.2 Second Area]

The switching command control unit 400 of the second area 120 is constituted of an AC input circuit 410, sensor input circuit 420, DI input circuit 430, input control unit 440, switching command output control unit 450, switching command output unit 10 and I/O bus interface (I/F) 490. The configurations of the switching command control unit 400_1 to 400_N, corresponding to the circuit breaker 1100_1 to circuit breaker 1100_N, are the same.

The AC input circuit 410 and the sensor input circuit 420 are constituted of, for example, an insulation circuit, analog filter (generally a low pass filter), sampling hold circuit, multiplexer and analog-digital converter, which are not illustrated, so as to load a main circuit current signal, system voltage signal, and a sensor signal (e.g. pressure), as analog information, holding them at a predetermined sampling interval, then converting them into digital quantities.

In the AC input circuit 410, in particular, a main circuit current signal and a system voltage signal are input from the current transformer 1200 and voltage transformer 1300. In the sensor input circuit 420, a pressure signal from an operation pressure sensor for measuring the state quantity of the circuit breaker 1100, a temperature signal from the temperature sensor, a stroke signal from the stroke sensor and a control voltage from the circuit breaker 1100, and the like, are input, although none are illustrated.

In this circuit configuration, the sampling hold circuit and multiplexer may be omitted, and an analog-digital converter may be disposed for each input signal, or an analog-digital converter built-in to the sampling hold circuit may be used. It is not necessary to input all of the main circuit current signal, system voltage signal, sensor signal (e.g. pressure) and all the electrical quantities shown in the first embodiment, and needless to say, the input circuit configuration can be changed according to the control algorithm to be used.

In the DI (Digital Input) circuit 430, the contacts a and b of the circuit breaker 1100, which are the state quantities of the circuit breaker 1100, the switching command signal for a circuit breaker 1100 from such a superordinate device 2000 as a protective relay device and BCU, and other digital signals are input. Although this is not illustrated, the DI input circuit 430 loads the digital input quantities by holding at a predetermined sampling interval using the sampling hold circuit and the like.

The input control unit 440 is a logic circuit constituted by a PLD (Programmable Logical Device) or an FPGA (Field Programmable Gate Array). This input control unit 440 controls the operation timing of sampling hold circuit, multiplexer and analog-digital converter in the AC input circuit 410, sensor input circuit 420 and the DI input circuit 430. The input control unit 440 not only controls the operation timing of each of the above mentioned circuits, but also controls data transmission to send such digital quantities as a main circuit current signal, system voltage signal, sensor signal (e.g. pressure), contacts a and b of the circuit breaker, and switching command signal to the switching control arithmetic operation unit 200 in the first area 110 via the I/O bus interface 490.

The switching command output control unit 450 is a logic circuit constituted by a PLD (Programmable Logical Device) or an FPGA (Field Programmable Gate Array), and has a hardware counter 20 included therein. The switching command output control unit 450 receives a synchronous delay count value D which is sent from the switching control arithmetic operation unit 200 via the I/O bus interface 490, executes a predetermined synchronous delay counter control, and outputs a trigger signal to the switching command output unit 10. According to the configuration in FIG. 2, the hardware counter 20 is included in the switching command output control unit 450, but the hardware counter 20 may be omitted depending on the control algorithm to be used.

The switching command output unit 10 is normally constituted by such a semiconductor switch as an FET and IGBT, and this semiconductor switch is turned ON by a trigger signal from the switching command output control unit 450. When the semiconductor switch has been turned ON, that is, when the switching command output unit 10 has been turned ON, a switching command signal (circuit breaker drive current) of the circuit breaker 1100 of which switching is synchronously controlled flows to the circuit breaker drive coil 1110 included in the circuit breaker 1100, and the circuit breaker 1100 opens or closes.

The common input/output unit 900 disposed in the second area 120 is constituted of a DO (Digital Output) circuit for failure alarm contact 910, an LED control circuit 920 for an LED to indicate power ON and an LED to indicate a failure alarm, and I/O bus interface (I/F) 990. The system voltage signal (bus side voltage signal) acquired from the voltage transformer 1300 is common information used in a substation, so it is information shared by the circuit breaker 1101_1 to circuit breaker 1100_N. Therefore, the AC input circuit for the system voltage signal (bus side voltage signal) may be integrated into the common input/output unit 900.

The ambient temperature and control voltage of the circuit breaker 1100 are also common information of the circuit breaker 1100_1 to circuit breaker 1100_N, so the sensor input circuit for the ambient temperature and control voltage, which are common input signals, may be integrated into the common input/output unit 900.

The I/O bus interfaces 490, 990 are interfaces of the parallel transmission medium 140, which is an I/O bus for communicating data between the first area 110 and the second area 120.

For the parallel transmission medium 140, a general purpose parallel bus, such as a PCI bus, compact PCI bus and VME bus, may be used, or a parallel bus, dedicated to the hardware configuration to be used, may be used. In the case of a dedicated parallel bus, synchronous delay count value D and other data may be transmitted/received via a leased line. All or a part of the parallel transmission medium 140 may be replaced with serial transmission medium.

[1.2 Functions]

The concrete synchronous switching control operation of the switching controller for circuit breaker 100 according to the first embodiment will now be described.

[1.2.1 Synchronous Switching Control Operation]

To perform synchronous switching control for opening or closing the contacts of the circuit breaker 1100 at a predetermined phase of the main circuit current or system voltage, the switching command signal of the circuit breaker 1100 is input from the superordinate device 2000, such as a protective relay device and BCU, to the switching command control unit 400 in the second area 120 of the switching controller for circuit breaker 100.

Then a predetermined delay time for each circuit breaker 1100 is computed in the MPU for switching control arithmetic operation 210 in the switching control arithmetic operation unit 200 in the first area 110. In other words, the MPU for switching control arithmetic operation 210 in the switching control arithmetic operation unit 200 performs arithmetic operations to determine a synchronous delay count value D of each circuit breaker 1100. A method for determining the synchronous delay count value D will be described later.

When the predetermined delay time for each circuit breaker 1100 has been computed, this delay time (synchronous delay count value) is sent to each switching command control unit 400 of the corresponding circuit breaker via the parallel transmission medium 140, which is an I/O bus. In the switching command control unit 400 for the circuit breaker, this delay time received via the I/O bus interface 490 is input to the switching command output control unit 450.

The hardware counter 20 of the switching command output control unit 450, for the switching command signal received from the superordinate device 2000, counts the synchronous delay count value D, which is the delay time. When the semiconductor switch of the switching command output unit 10 turns ON after counting completes, the switching command signal (circuit breaker drive current) after the synchronous switching control is output to the circuit breaker drive coil 1110 of the circuit breaker 1100.

The delay time for each circuit breaker 1100 computed by the MPU for switching control arithmetic operation 210 of the switching control arithmetic operation unit 200 is sent to the switching command control unit 400 for each corresponding circuit breaker 1100, so the synchronous switching control as described above is performed for each of the circuit breakers 1100. In other words, the synchronous delay count value D, which is a predetermined delay time of the switching command signal, is calculated for each of the circuit breaker 1100_1 to the circuit breaker 1100_N in the MPU for switching control arithmetic operation 210 of the switching control arithmetic operation unit 200, respectively.

The switching command control unit 400_1 to switching command control unit 400_N corresponding to the circuit breaker 1100_1 to circuit breaker 1100_N receive the synchronous delay count value D_1 to synchronous delay count value D_N calculated by the MPU for switching control arithmetic operation 210 of the switching control arithmetic operation unit 200, respectively. The hardware counter 20_X of the switching command output control unit 450_X of each switching command control unit 400_X (X: any of 1 to N) counts the synchronous delay count value D_X and turns ON the semiconductor switch of the switching command output unit 10_X at a predetermined timing, so as to control the synchronous switching of the circuit breaker 1100_X.

By this control operation, the switching controller 100 for the circuit breaker 1100 can perform synchronous switching control individually for the circuit breaker 1100_to circuit breaker 1100_N.

[1.2.2 Computation of Synchronous Delay Count Value D]

Figure 3:
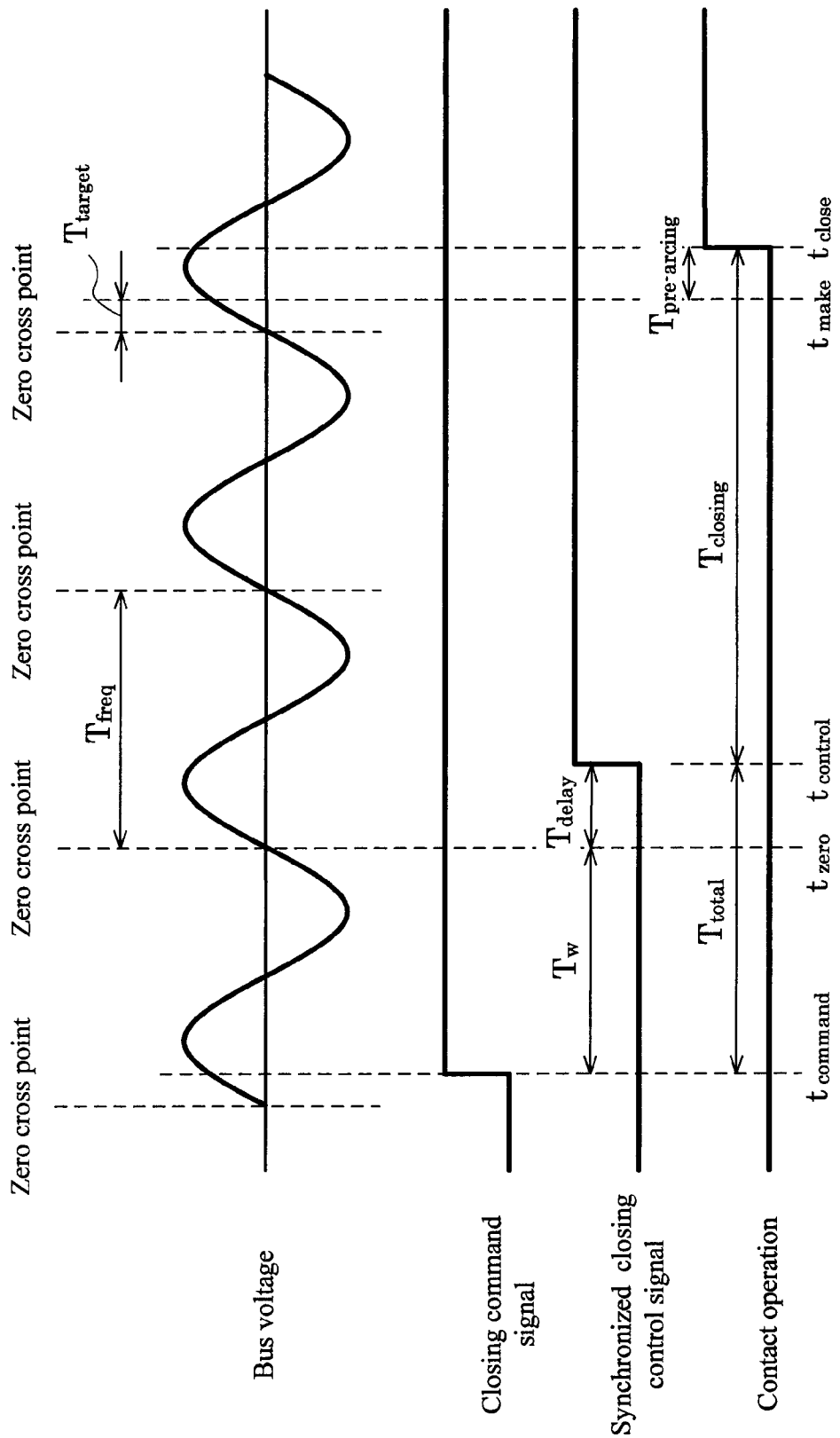
FIG. 3 is a timing chart depicting the synchronous closing control according to the first embodiment of the present invention.

Computation of the synchronous delay count value D shown above will be described in detail with reference to FIG. 3, using an example of the synchronous closing control algorithm used by the switching controller for circuit breaker 100 according to the first embodiment. FIG. 3 is an example of a timing chart depicting the closing control method of the switching controller for circuit breaker 100 according to the first embodiment.

In the case of the model shown in FIG. 3, the switching command control unit 400 detects the closing command signal transmitted from the superordinate device 2000 at the timing of $t_{command}$ and then waits for the timing $t_{zero}$ of the zero cross-point of the bus side voltage, which comes next. $T_w$ in FIG. 3 denotes the waiting time for the zero cross-point. From the next timing $t_{zero}$ of the zero cross-point, at the timing of $t_{control}$ after the elapse of the delay time of the synchronous closing delay time $T_{delay}$, which is the synchronous delay count value D received from the switching control arithmetic operation unit 200 of the first area 110, the switching command control unit 400 outputs the closing command signal performed synchronous closing control for the circuit breaker 1100, whereby the circuit breaker 1100 closes at a predetermined phase (mechanical closing timing of the contact; timing of $t_{close}$ in FIG. 3) of the system voltage (bus side voltage).

According to this timing chart in FIG. 3, the synchronous closing delay time $T_{delay}$, which is a synchronous delay count value D, is calculated as follows in the MPU for switching control arithmetic operation 210 of the switching control arithmetic operation unit 200. In other words, the synchronous closing delay time $T_{delay}$ is calculated by the following expression, using time $T_{target}$ from the zero-cross point to the target closing phase (target electric closing phase, timing of $t_{make}$ in FIG. 3), pre-arc time $T_{pre-arcing}$ corresponding to the target closing phase, closing operation time $T_{closing}$ of the circuit breaker 1100, and the system cycle $T_{freq}$.

$$T_{delay}=T_{freq}+(T_{target}+T_{pre-arcing}-(T_{closing}\%T_{freq}))$$

$$(0 \le T_{delay} < 2 \times T_{freq}) \quad \text{[Expression 1]}$$

where ($T_{closing} \% T_{freq}$) is a remainder of $T_{closing}/T_{freq}$.

Here the pre-arc time $T_{pre-arcing}$ is calculated by the following expression using the voltage wave height value $V_{make}$ at the target closing phase and rate of decay of dielectric strength RDDS across the contacts.

$$T_{pre-arcing}=V_{make}/RDDS \quad \text{[Expression 2]}$$

The closing operation time $T_{closing}$ of the circuit breaker 1100 fluctuates depending on the ambient temperature, control voltage, operation pressure and the like of the circuit breaker 1100. Therefore, the closing operation time $T_{closing}$ of the circuit breaker 1100 must be constantly corrected based on such conditions as the ambient temperature, control voltage and operation pressure of the circuit breaker 1100.

Specifically as shown in FIG. 2, data on the ambient temperature, control voltage and operation pressure of the circuit breaker 1100 is constantly acquired by the sensor input circuit 420 of the switching command control unit 400 in the second area 120, so the MPU for switching control arithmetic operation 210 can perform correction computation of the closing operation time $T_{closing}$ based on the ambient temperature, control voltage and operation pressure of the circuit breaker using this data, which is transmitted to the switching control arithmetic operation unit 200 in the first area 110 via the parallel transmission medium 140.

The synchronous closing control was described above, but the synchronous opening control can also be implemented by a similar operation and functions. The synchronous opening control, however, is normally performed based on the zero cross-point of the main circuit current, and the pre-arc time need not be considered. The synchronous switching control algorithm shown in the first embodiment is merely an example, and any other synchronous switching control algorithm can be applied to the present invention.

[1.3 Effects]

The switching controller for circuit breaker 100 according to the first embodiment has the following effects.

Conventionally, when a switching controller for circuit breaker is applied to a circuit breaker in a lower branch system, such as a power distribution system, one switching controller for circuit breaker must be applied to one circuit breaker, which increases the cost and installation space, but if the switching controller for circuit breaker 100 according to the first embodiment is applied, one switching controller for circuit breaker 100 can control the switching of a plurality of circuit breakers 1100. Therefore, even if circuit breakers are used in a lower branch system, such as a power distribution system, it is not necessary to install switching controllers of the same number as that of circuit breakers, so a switching controller for circuit breaker which can decrease cost and space can be provided.

In the present invention, the system voltage signal (bus side voltage signal), ambient temperature and control voltage of the circuit breaker, and the like, out of various information required for synchronous switching control arithmetic operation of the circuit breaker, can be handled as common information shared by each circuit breaker in N circuits. Then cost and space can be further saved, wiring construction can be decreased, and the switching controller for circuit breaker 100 can be more easily applied to a circuit breaker in a lower branch system.

[1.4 Other Embodiments]

A target of the above-mentioned switching controller for circuit breaker 100 according to the first embodiment target is a single-phase operation-type circuit breaker for 3 phases, but includes an embodiment applied to a non-phase segregated operation-type circuit breaker.

In the case of a non-phase segregated operation-type circuit breaker, which has one operation mechanism, only one quantity unit of switching command signal (common switching command signal for 3 phases) is used. Therefore, if the switching controller for circuit breaker 100 is applied to a non-phase segregated operation-type circuit breaker, only a semiconductor switch for 1 phase can be used for control, among the semiconductor switches provided for 3 phases in the switching command output unit 10. Regarding sensor signals for pressure and control voltage, only one quantity unit for each signal can also be input.

If such aspects are considered, the configuration of the switching controller for circuit breaker 100 described in [1.2 Configuration] can be directly applied to the non-phase segregated operation-type circuit breaker. Needless to say, in this case, an algorithm optimum for the non-phase segregated operation-type circuit breaker is used for the synchronous switching control algorithm.

As described above, functions and effects similar to the above can be implemented even in the case of an embodiment using the non-phase segregated operation-type circuit breaker. The non-phase segregated operation-type circuit breaker is often used as a circuit breaker in a lower branch system, such as a power distribution system, so even in such a case, the switching controller for circuit breaker according to the present invention can be easily applied.

2. Second Embodiment

[2.1 Configuration]

Figure 4:
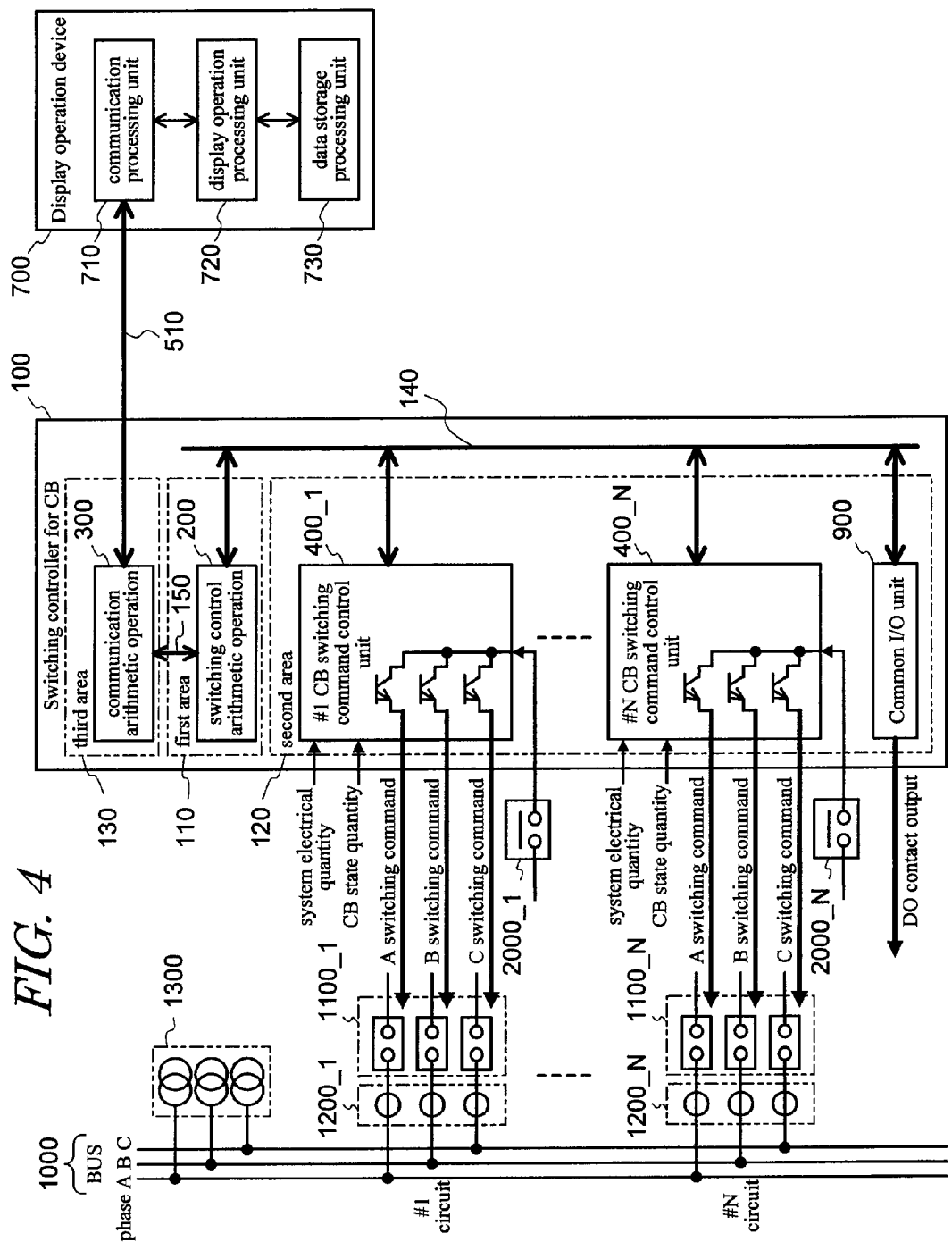
FIG. 4 is a diagram depicting a system configuration of the switching controller for circuit breaker and peripheral circuits according to the second embodiment of the present invention.

Configuration of a system of the switching controller for circuit breaker and peripheral circuits thereof according to the second embodiment of the present invention (hereafter switching control system for circuit breaker) will be described next with reference to FIG. 4. As FIG. 4 shows, 100 denotes a switching controller for circuit breaker, 700 denotes a display operation device, and 510 denotes a communication transmission medium, and these aspects, which are characteristics of the second embodiment, will be described herein below. The main circuit 1000, circuit breaker 1100, current transformer 1200 and voltage transformer 1300, which have the same configuration as the first embodiment, are denoted with the same reference symbols, and description thereof is omitted.

[2.1.1 Switching Controller for Circuit Breaker]
[2.1.1.1 General Configuration]

Major components of the switching controller for circuit breaker 100 according to the second embodiment will be described first. As FIG. 4 shows, the switching controller for circuit breaker 100 according to the second embodiment is constituted of a first area 110 which performs switching control arithmetic operation to open or close a circuit breaker 1100 at a desired phase of the system voltage or main circuit current from a transformer 1300 or a main circuit 1000, a second area 120 which outputs a delay-controlled opening command signal or delay-controlled closing command signal to the circuit breaker 1100 based on the switching control arithmetic operation result of the first area 110, and a third area 130 which transmits/receives information to/from a display operation device 700 via a communication transmission medium 510, and transmits/receives information to/from the first area 110.

The entity of the first area 110 of the switching controller for circuit breaker 100 is a switching control arithmetic operation unit 200 which is a substrate of which main components are an MPU (microprocessor) for switching control arithmetic operation and a memory. This is largely the same as the first embodiment, and the slight difference will be described later. The entity of the second area 120 of the switching controller for circuit breaker 100 is switching command control units 400_1 to 400_N constituted by N number of substrates, and a common input/output unit 900 constituted by one substrate, and description thereof, which is the same as the first embodiment, is omitted.

The entity of the third area 130 of the switching controller for circuit breaker 100, which is a characteristic of the second embodiment, is a communication arithmetic operation unit 300 which is a substrate constituted of mainly an MPU (microprocessor) for communication operation and a communication interface (I/F). A concrete configuration will be described in detail in [2.1.1.2 Concrete configuration].

Concerning the connection relationship of the first area 110, second area 120 and third area 130 of the switching controller for circuit breaker 100, the first area 110 and the second area 120 of the switching controller for circuit breaker 100 are connected via the parallel transmission medium 140, just like the first embodiment, and the third area 130 is connected with the first area 110 via a transmission medium 150 for transmitting/receiving data between the respective MPUs.

The third area 130 of the switching controller for circuit breaker 100 is directly connected to the display operation device 700 via the communication transmission medium 510. In other words, the communication arithmetic operation unit 300 of the third area 130 is directly connected to the communication transmission medium 510.

The first area 110 and the second area 120, on the other hand, are not directly connected to the display operation device 700 via the communication transmission medium 510. In other words, the switching control arithmetic operation unit 200 of the first area 110, and the switching command control unit 400 and the common input/output unit 900 of the second area 120 are not directly connected to the communication transmission medium 510.

[2.1.1.2 Concrete Configuration]

Figure 5:
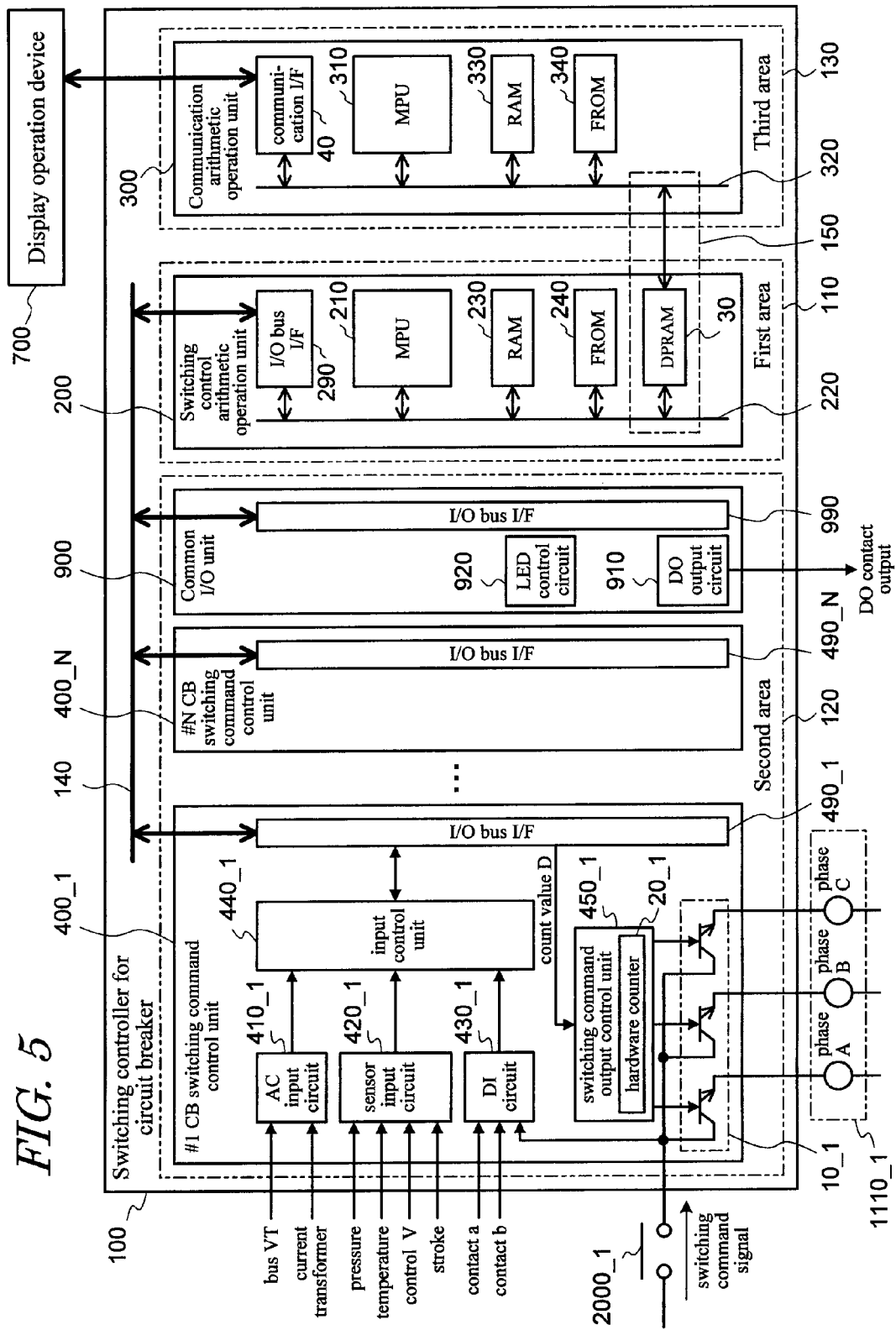
FIG. 5 is a detailed block diagram of the switching controller for circuit breaker according to the second embodiment of the present invention.

Concrete configuration of the switching controller for circuit breaker 100 according to the second embodiment will now be described with reference to FIG. 5. FIG. 5 is a detailed block diagram of the switching controller for circuit breaker 100 according to the second embodiment. Description on the second area 120 of the switching controller for circuit breaker 100, which has the same configuration as the first embodiment, will be omitted.

The first area 110 has a major configuration that is the same as the first embodiment, and has an MPU (microprocessor) for switching control arithmetic operation 210, RAM 230, FROM 240 (Flash ROM, alternatively, a rewritable non-volatile memory such as EEPROM, can be used), and I/O bus interface 290, which are inter-connected via a local bus 220. In the second embodiment, in addition to this configuration, a DPRAM (Dual Port RAM) 30 is also connected via the local bus 220.

In the configuration in FIG. 5, a configuration in which the DPRAM 30 is disposed in the switching control arithmetic operation unit 200 is used, but the DPRAM 30 may be disposed in the communication arithmetic operation unit 300 in the third area 130.

The third area 130 is constituted by the communication arithmetic operation unit 300, as mentioned above, and the communication arithmetic operation unit 300 is constituted of an MPU for communication arithmetic operation 310, RAM 330, FROM (Flash ROM, alternatively, a rewritable non-volatile memory such as EEPROM, can be used) 340, and a communication interface 40, which are inter-connected via a local bus 320.

This local bus 320 is constituted by a dedicated parallel bus for hardware configuration in-use, or such a general purpose parallel bus as a PCI bus, compact PCI bus and VME bus. The communication interface 40 is an interface for connecting the communication transmission medium 510. According to FIG. 5, the MPU for communication arithmetic operation 310 and the communication interface 40 are connected via the local bus 320, but may be connected via a dedicated local bus.

The MPU for communication arithmetic operation 310 of the communication arithmetic operation unit 300 is connected to the MPU for switching control arithmetic operation 210 of the switching control arithmetic operation unit 200 via the transmission medium 150 so as to mutually transmit/receive data. Concrete arithmetic operation of the MPU for communication arithmetic operation 310 will be described later.

As FIG. 5 shows, the transmission medium 150 has a configuration in which the local bus 220 of the switching control arithmetic operation unit 200 in the second area 120 and the local bus 320 of the communication arithmetic operation unit 300 in the third area 130 are connected via the DPRAM 30. For the transmission medium 150, a dedicated parallel bus such as a PCI bus, compact PCI bus and VME bus or dedicated serial bus may be used, instead of using a DPRAM.

[2.1.2 Display Operation Device]

The configuration of the display operation device 700 according to the second embodiment will now be described with reference to FIG. 4. As FIG. 4 shows, the display operation device 700 is mainly constituted of a communication processing unit 710, display operation processing unit 720 and data storage processing unit 730. A concrete configuration example of the display operation device 700 is such a general purpose computer as a personal computer and a workstation.

Since the communication transmission medium 510 is for serial communication (e.g. RS-232C communication), the communication processing unit 710 is constituted of a serial communication interface circuit of a general purpose computer (e.g. using an RS-232C interface), and the corresponding terminal software and the like. The display operation processing unit 720 is constituted of display/operation/data processing software which run on the CPU of a general purpose computer, and such a display device as a monitor. The data storage processing unit 730 is constituted of data storage software which runs on the CPU of a general purpose computer, and such an external storage device as a hard disk and CD-ROM.

The display operation device software, such as terminal software, display/operation/data processing software and data storage software, which run on a general purpose computer, are specially developed according to the hardware-specific configuration of the computer, operating system and related software to be used, but commercial software may be used for part or all of this software.

As described above, the display operation device 700 is implemented by installing display operation device software on a general purpose computer which satisfies the required operation conditions, including a serial communication interface circuit, the CPU in which the display operation device software can run, and an external storage device, such as a hard disk. Particularly in the second embodiment, the general purpose computer, in which the display operation device software is installed, is handled as the display operation device 700, unless otherwise specified. In the second embodiment, the display operation device 700 may be implemented by a dedicated hardware unit, and communication processing unit 710, display operation processing unit 720 and data storage processing unit 730 may be implemented by a piece of software which runs on the dedicated hardware unit.

The communication transmission medium 510 is constituted by serial communication (e.g. RS-232C communication), but a method other than serial communication may be used. For example, a parallel interface, such as SCSI, may be used, or a communication network (e.g. LAN) may be used, just like the later mentioned third embodiment of the present invention. In this case, the communication processing unit 710 of the display operation device 700 is constituted of an Ethernet® LAN interface circuit (Ethernet® is a registered trademark) for a general purpose computer and software for LAN communication.

[2.2 Functions]

The functions of the switching control system for circuit breaker according to the second embodiment will be described next, but detailed description on concrete synchronous switching control operation will be omitted, since it is the same as the first embodiment, and concrete data acquisition/storage operation, and setting operation of settling value in this switching control system for circuit breaker will be described herein below.

[2.2.1 Data Acquisition/Storage Operation]

When the synchronous switching control of the circuit breaker 1100 has been executed, the switching controller for circuit breaker 100 stores the synchronous switching control related data at this time, and in concrete terms, the switching controller for circuit breaker 100 stores the synchronous switching control related data, for example, including the main circuit current waveforms/system voltage waveforms before and after the circuit breaker switching operation, stroke waveforms of the circuit breaker, switching operation time of the circuit breaker, the state data of the circuit breaker (e.g. operation pressure, temperature, control voltage), and the like.

Concerning the data acquisition/storage operation of the switching controller for circuit breaker 100 when the synchronous switching control for the circuit breaker 1100 has been executed, the synchronous switching control related data is acquired in the first area 110, from the switching command control unit 400_X (X: any of 1 to N) corresponding to the control target circuit breaker 1100 having operated this time, out of the switching command control units 400_1 to 400_N of the second area 120 via the parallel transmission medium 140, which is an I/O bus. By this, the MPU for switching control arithmetic operation 210 of the switching control arithmetic operation unit 200 of the first area 110 writes this acquired synchronous switching control related data to the DPRAM 30 of the transmission medium 150.

As soon as the synchronous switching control related data is written to the DPRAM 30 in the first area 110, the MPU for communication arithmetic operation 310 of the communication arithmetic operation unit 300 in the third area 130 acquires, via the transmission medium 150, the synchronous switching control related data written to the DPRAM 30 of the transmission medium 150. Then the MPU for communication arithmetic operation 310 of the communication arithmetic operation unit 300 stores the acquired synchronous switching control related data in the FROM 340.

When an acquisition request of the synchronous switching control related data is generated from the display operation device 700 to the switching controller for circuit breaker 100 at this stage, the MPU for communication arithmetic operation 310 of the communication arithmetic operation unit 300 of the third area 130 transfers the synchronous switching control related data stored in the FROM 340 to the display operation device 700 via the communication transmission medium 510. The display operation device 700 stores this transferred synchronous switching control related data in the data storage processing unit 730, which is an external storage device, such as a hard disk, and the display operation processing unit 720 displays the synchronous switching control related data on the display device, such as a monitor, using the display/operation/data processing software as an HMI (HuMan Interface).

[2.2.2 Setting Operation]

A concrete setting operation in the switching controller for circuit breaker 100 when the synchronous switching control of the circuit breaker 1100 is executed will be described. The switching controller for circuit breaker 100 must set the settling values/setting values in order to control synchronous switching of the circuit breaker 1100, and concretely, the settling values/setting values, for example, such as the target opening phase, target closing phase, switching operation time of the circuit breaker, and operation characteristic data of the circuit breaker, are set in the switching controller for circuit breaker 100.

Now the setting operation of the settling values/setting values in the switching controller for circuit breaker 100, when the synchronous switching control of the circuit breaker 1100 is executed, will be described. First the display operation device 700, using display/operation/data processing software as the HMI (HuMan Interface), sends the settling values/setting values which were input from an HMI, or the settling values and setting values stored in the display operation device 700 in the form of file, to the communication arithmetic operation unit 300 in the third area 130 via the communication transmission medium 510.

When the settling values/setting values are sent from the communication arithmetic operation unit 300 in the third area 130, the MPU for communication arithmetic operation 310 of the communication arithmetic operation unit 300 stores the settling values/setting values in the FROM 340. Then in the first area 110, the MPU for switching control arithmetic operation 210 of the switching control arithmetic operation unit 200 acquires the settling values/setting values via the DPRAM 30 of the transmission medium 150, whereby the settling values and setting values are set in the switching controller for circuit breaker 100, and are used for execution of synchronous switching control.

[2.3 Effects]

The switching control system for circuit breaker according to the second embodiment has the following effects in addition to the effects of the first embodiment.

In the display operation device 700 connected to the switching controller for circuit breaker 100 according to the second embodiment, the synchronous switching control related data can be acquired and stored via the communication transmission medium 510, using the display/operation/data processing software, which runs on a general purpose computer as an HMI (HuMan Interface). By this display operation device 700, an operator can set the settling values/ setting values of the switching controller for circuit breaker 100 via the communication transmission medium 510, using the display/operation/data processing software which runs on a general purpose computer as an HMI.

Also in the switching control system for circuit breaker according to the second embodiment, the switching control arithmetic operation unit 200 which performs arithmetic operations related to the synchronous switching control and the display operation device 700 are completely separated. In other words, the MPU for switching control arithmetic operation 210 of the switching control arithmetic operation unit 200 and the MPU for communication arithmetic operation 310 which performs arithmetic operations related to the communication with the HMI of an operator, that is the display operation device 700, are completely separated.

Therefore, communication with the HMI of the display operation device 700 is executed without interrupting arithmetic operations related to the synchronous switching control, which is the most important processing of this system, and the operator can acquire necessary synchronous switching control rated data at any time.

3. Third Embodiment

[3.1 Configuration]

Figure 6:
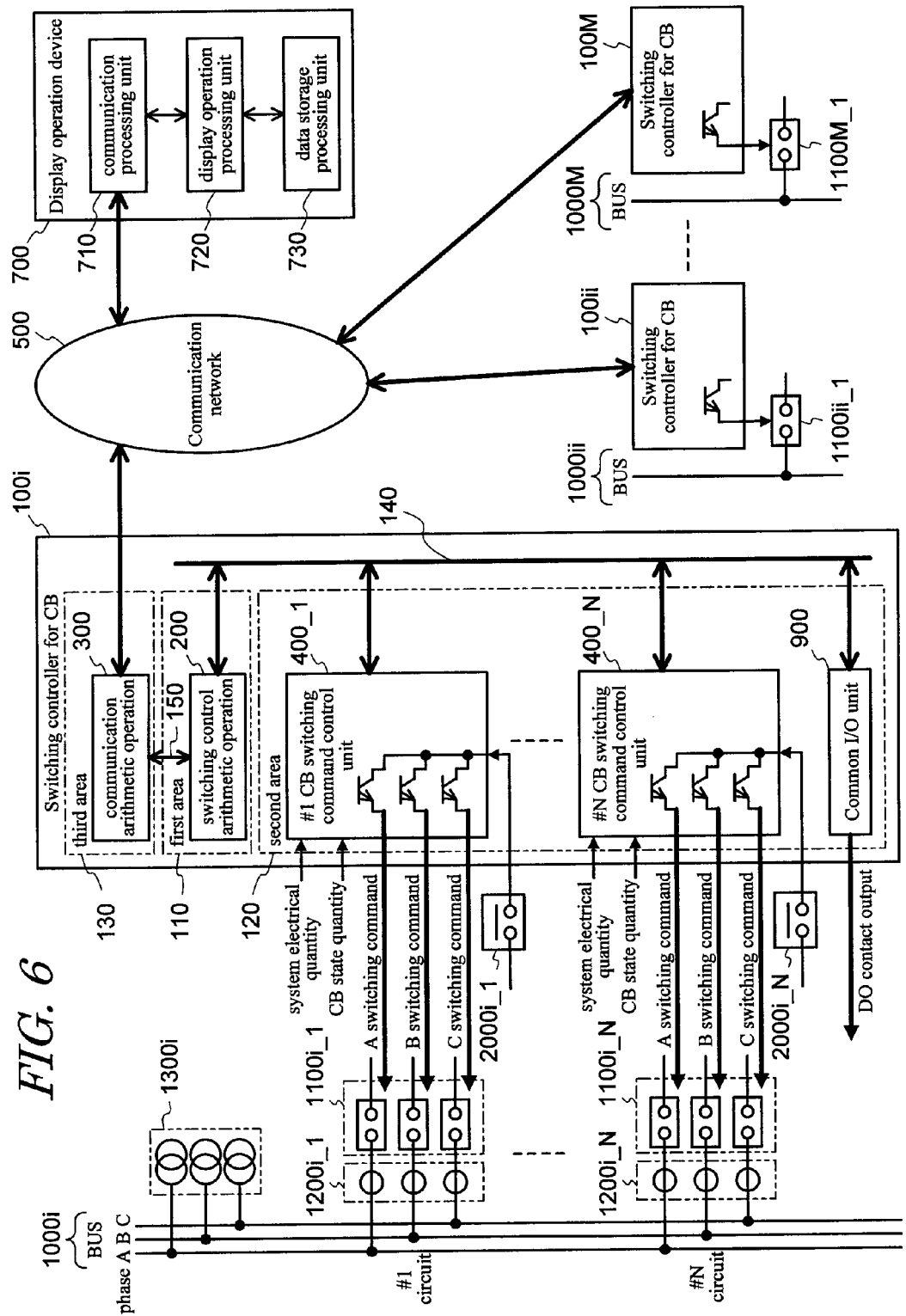
FIG. 6 is a diagram depicting a system configuration of the switching controller for circuit breaker and peripheral circuits according to the third embodiment of the present invention.

The configuration of the system of the switching controller for circuit breaker and peripheral circuits thereof according to the third embodiment of the present invention (hereafter switching control system for circuit breaker) will be described next with reference to FIG. 6. As FIG. 6 shows, 100$i$ to 100M denote switching controllers for circuit breaker, 700 denotes a display operation device, and 500 denotes a communication network, and this aspect, which is a characteristic of the third embodiment, will be described herein below.

The other main circuits 1000$i$ to 1000M, circuit breakers 1100$i$_1 to 1100M_N, current transformers 1200$i$_1 to 1200M_N, and voltage transformers 1300$i$ to 1300M, which have the same configurations as the first embodiment, are denoted with the same reference symbols, and description thereof is omitted. The suffixes i to M attached to the circuit breakers 1100$i$_1 to 1100M_N, current transformers 1200$i$_1 to 1200M_N, and voltage transformers 1300$i$ to 1300M correspond to the suffixes i to M of the different main circuits 1000$i$ to 1000M, and are omitted herein below unless necessary. The main circuits 1000$i$ to 1000M may be different main circuits in a same power station (e.g. a plurality of main circuits of different voltage classes, or two main circuits in a same voltage class of which buses are separated), or may be different main circuits in different electric stations.

[3.1.1 Switching Controller for Circuit Breaker]

The major components of the switching controller for circuit breaker 100 according to the third embodiment will be described first.

As FIG. 6 shows, the switching controller for circuit breaker 100 according to the third embodiment is constituted of a first area 110 which performs switching control arithmetic operation to open or close a circuit breaker 1100 in a desired phase of the system voltage or main circuit current from a transformer 1300 or a main circuit 1000, a second area 120 which outputs a delay-controlled opening command signal or delay-controlled closing command signal to the circuit breaker 1100 based on the switching control arithmetic operation result of the first area 110, and a third area 130 which transmits/receives information to/from a display operation device 700 via a communication network 500, and transmits/receives information to/from the first area 110.

Description of the configurations of the first area 110 and the second area 120, which are the same as the second embodiment, is omitted.

The entity of the third area 130 of the switching controller for circuit breaker 100 is a communication arithmetic operation unit 300 which is a substrate of which component are an MPU (microprocessor) for communication arithmetic operation and a communication interface (I/F), and which is largely the same as the second embodiment. In other words, just like the case of FIG. 5 which shows the configuration of the switching controller for circuit breaker 100 according to the second embodiment, the communication arithmetic operation unit 300 of the third area 130 is constituted of an MPU (microprocessor) for communication arithmetic operation 310, RAM 330, FROM 340 (Flash ROM, alternatively, a rewritable non-volatile memory such as EEPROM, can be used), and a communication interface 40, which are interconnected via a local bus 320.

However, in the third area 130 of the switching controller for circuit breaker 100 according to the third embodiment, the communication interface 40 disposed in the communication arithmetic operation unit 300 is an interface for connecting the switching controller for circuit breaker 100 to the communication network 500, which is the difference from the second embodiment. This is why the switching controller for circuit breaker 100 according to the third embodiment and the display operation device 700 are connected via the communication network 500.

Concerning the connection relationship of the first area 110, second area 120 and third area 130 of the switching controller for circuit breaker 100, the first area 110 and the second area 120 of the switching controller for circuit breaker 100 are connected via the parallel transmission medium 140, just like the second embodiment, and the third area 130 is connected with the first area 110 via a transmission medium 150 for transmitting/receiving data between the respective MPUs.

The third area 130 of the switching controller for circuit breaker 100 is directly connected to the display operation device 700 via the communication network 500, which is a characteristic of the third embodiment. In other words, the communication arithmetic operation unit 300 of the third area 130 is directly connected to the communication network 500.

The first area 110 and the second area 120, on the other hand, are not directly connected to the display operation device 700 via the communication network 500. In other words, the switching control arithmetic operation unit 200 of the first area 110, and the switching command control unit 400 and the common input/output unit 900 of the second area 120 are not directly connected to the communication network 500.

[3.1.2 Communication Network]

The configuration of the communication network 500 according to the third embodiment will be described next. This communication network 500 is constituted by an Ethernet® LAN (Ethernet® is a registered trademark), and connects each switching controller for circuit breaker 100i to 100M and the display operation device 700 respectively in a local range, such as in an electric station, and in a wide area range among different electric stations. The Ethernet® LAN used here as an example is generally known, therefore detailed description of the configuration thereof is omitted.

This communication network 500 inter-connects the switching controllers for circuit breaker 100i to 100M and the display operation device 700 via a switching hub or such a hub as a repeater, using a connection based on such a twist pair cable as 10BASE-T and 100BASE-TX, or a connection based on such an optical cable as 100BASE-FX, although these are not illustrated. A configuration in which one switching controller for circuit breaker 100 and the display operation device 700 are connected one-to-one, using a cross-cable as a connection medium, may be used.

[3.1.3 Display Operation Device 700]

The configuration of the display operation device 700 according to the third embodiment will now be described with reference to FIG. 6. As FIG. 6 shows, the display operation device 700 is mainly constituted of a communication processing unit 710, display operation processing unit 720 and data storage processing unit 730. The entity of the display operation device 700 is a general purpose computer, such as a personal computer and workstation.

The communication processing unit 710, which uses Ethernet® LAN as the communication network 500, is constituted of an Ethernet® LAN interface circuit of a general purpose computer, and LAN communication software. The display operation processing unit 720 is constituted of display/operation/data processing software which runs on a CPU of a general purpose computer, and such a display device as a monitor. The data storage processing unit 730 is constituted of data storage software which runs on a CPU of a general purpose computer, and such external storage device as a hard disk and CD-ROM.

The display operation device software, such as LAN communication software, display/operation/data processing software, and data storage software, which run on a general purpose computer, are specially developed according to a hardware configuration of the computer, operating system and related software to be used, but commercial software may be used for part or all of these software.

As described above, the display operation device 700 is implemented by installing the display operation device software on a general purpose computer which satisfies the required operation conditions, including the Ethernet® LAN interface circuit, CPU in which the display operation device software can run, and external storage device, such as a hard disk. Particularly, in the third embodiment, the general purpose computer in which the display operation device software is installed is handled as the display operation device 700, unless otherwise specified.

The display operation device software may be installed in a plurality of general purpose computers within an electric station or in different electric stations, so that a plurality of display operation devices 700 are constructed within an electric station, or in different electric stations, although this is not illustrated. The display operation device software may also be installed respectively in each of a plurality of general purpose computers of organization ranking higher than an electric station, such as a power station, power center, and head office and branch office of a power company, so that the display operation device 700, extending over organizations ranking higher than an electric station, is constructed.

In the third embodiment, the display operation device 700 may be implemented by a dedicated hardware unit, and the communication processing unit 710, display operation processing unit 720 and data storage processing unit 730 may be implemented by a piece of software which run on the dedicated hardware unit.

[3.2 Functions]

The functions of the switching control system for circuit breaker according to the third embodiment will be described next, but a detailed description on a concrete synchronous switching control operation is omitted since it is the same as the first embodiment.

Concerning a concrete data acquisition/storage operation, and a settling value/setting value setting operation in this switching control system for circuit breaker, according to the third embodiment in which a plurality of switching controllers for circuit breaker 100i to 100M and the display operation device 700 are inter-connected via the communication network 500, the synchronous switching related data and settling value/setting value are transmitted/received via this communication network 500. The other concrete data acquisition/storage operation and settling value/setting value setting operation are the same as the second embodiment, so description thereof is omitted.

[3.3 Effects]

The switching control system for circuit breaker according to the third embodiment described above has the following effects, in addition to the effects of the first and second embodiments.

In the display operation device 700 connected to the switching controller for circuit breaker 100 according to the third embodiment, the synchronous switching control related data can be acquired and stored easily from a remote place via the communication network 500, using the display/operation/data processing software which runs on a general purpose computer as an HMI (HuMan Interface). By this display operation device 700, an operator can easily set the settling values/setting values of the switching controller for circuit breaker 100 from a remote place via the communication network 500, using the display/operation/data processing software which run on a general purpose computer as an HMI.

Moreover, by disposing a plurality of general purpose computers equipped with display operation devices 700 in a plurality of electric stations and interconnecting these computers via the communication network 500, any of the switching controllers for circuit breaker 100i to 100M can be accessed from any of the general purpose computers equipped with display operation devices 700, although this is not illustrated. Thereby, the synchronous switching control related data of any of the switching controllers for circuit breaker 100i to 100M can be acquired and stored, and the settling values/setting values can be set from any of the general purpose computers.

By mutually accessing general purpose computers, one or several representative display operation device(s) 700 can be operated as a data server, and the synchronous switching control related data and settling values/setting values can be shared in this data server(s).

Although it is a matter of course, since the communication network 500 is used, the switching controllers for circuit breaker 100i to 100M to be the targets can be switched by the HMI, and there is no need for physically switching operation of a communication unit, for the purpose of such as maintenance of the switching controllers for circuit breaker 100i to 100M installed in a plurality of main circuits 1000, and the collection of various synchronous switching control related data. Therefore, by using a high-speed communication network 500 (e.g. Ethernet® LAN), a switching controller for circuit breaker and switching control system for circuit breaker which can easily be used from a remote place and can perform maintenance and data collection efficiently, compared with a conventional switching controller for circuit breaker, can be provided.

4. Fourth Embodiment

[4.1 Configuration]

Figure 7:
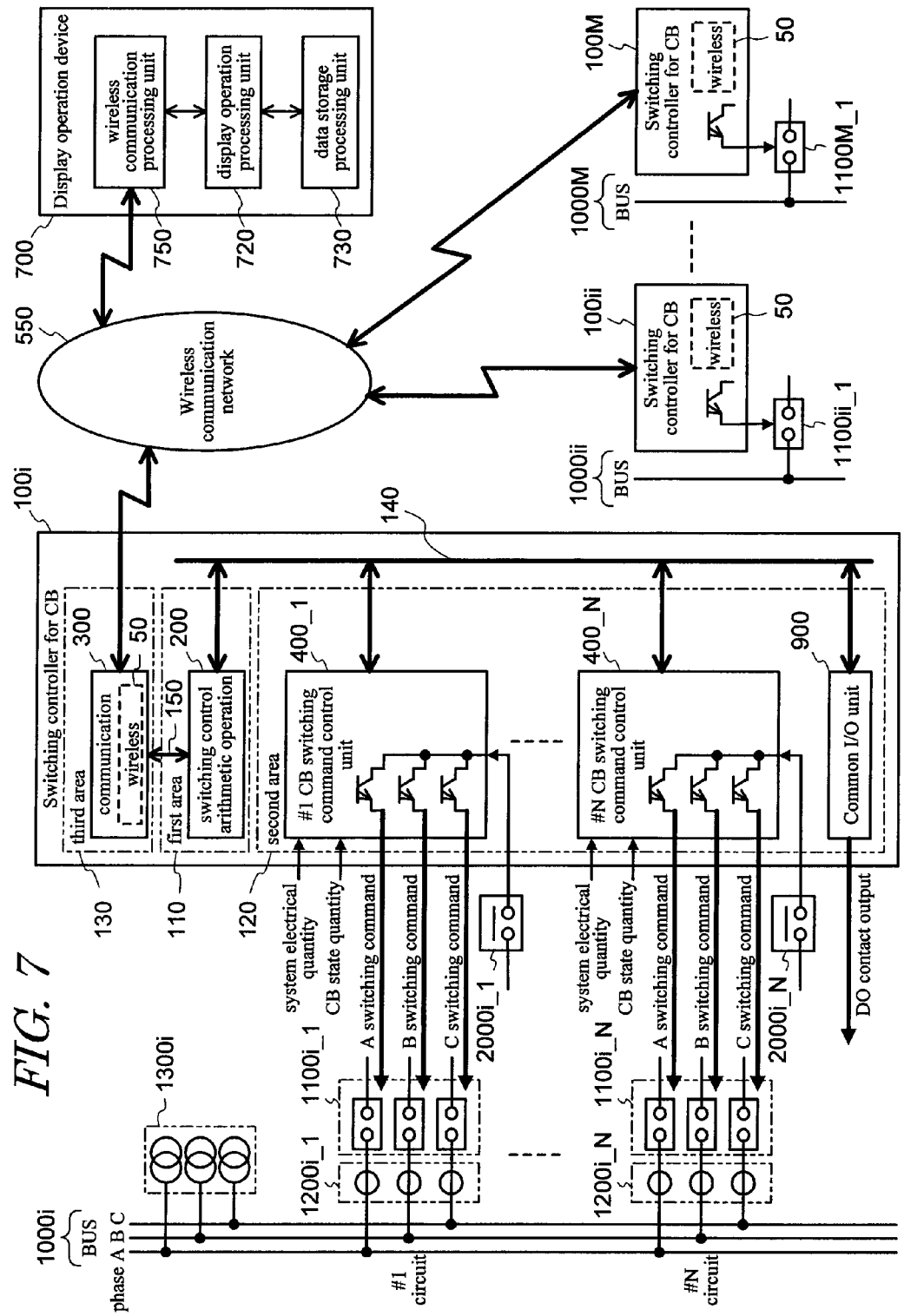
FIG. 7 is a diagram depicting a system configuration of the switching controller for circuit breaker and peripheral circuits according to the fourth embodiment of the present invention.

Configuration of a system of the switching controller for circuit breaker and peripheral circuits thereof according to the fourth embodiment of the present invention (hereafter switching control system for circuit breaker) will be described next with reference to FIG. 7. As FIG. 7 shows, 100i to 100M denote switching controllers for circuit breaker, 700 denotes a display operation device, and 550 denotes a wireless communication network, and this aspect, which is a characteristic of the fourth embodiment, will be described herein below. The other main circuits 1000i to 1000M, circuit breakers 1100i_1 to 1100M_N, current transformers 1200i_1 to 1200M_N, and voltage transformers 1300i to 1300M, which have the same configurations as the first embodiment, are denoted with the same reference symbols, and description thereof is omitted.

[4.1.1 Switching Controller for Circuit Breaker]

As FIG. 7 shows, the switching controller for circuit breaker 100 according to the fourth embodiment is characterized in that each communication arithmetic operation unit 300 of the switching controllers for circuit breaker 100i to 100M disposed in a same electric station or in different electric stations has a wireless communication unit 50 included therein. This wireless communication unit 50 is a result of that all or part of the communication interface 40 of the second embodiment has been replaced with one for wireless communication.

Therefore, in the fourth embodiment, both this wireless communication unit 50 and the cable communication interface 40 may be used in tandem. The configurations of the switching controllers for circuit breaker 100i to 100M, other than the wireless communication unit 50, are the same as the third embodiment, so description thereof is omitted.

In FIG. 7, this wireless communication unit 50 is included in the communication arithmetic operation unit 300 of the third area 130, but the system configuration in which this wireless communication unit 50 is disposed outside the switching controller for circuit breaker 100 may be used. If this system configuration is used, the same switching controller for circuit breaker 100 as the third embodiment is used, and the communication interface 40 in this switching controller for circuit breaker 100 and the wireless communication unit 50 disposed outside are connected via a cable Ethernet® LAN, for example.

[4.1.2 Display Operation Device]

As FIG. 7 shows, the display operation device 700 according to the fourth embodiment is characterized in that the wireless communication processing unit 750 is included as the communication processing unit. This wireless communication processing unit 750 is constituted of a wireless LAN interface circuit of a general purpose computer and wireless LAN communication software. Particularly, the wireless communication processing unit 750 is a result of that all or part of the communication processing unit 710 of the third embodiment is replaced with one for wireless communication.

Therefore, both the wireless communication processing unit 750 and the cable communication processing unit 710, that is both the wireless LAN interface circuit of a general purpose computer and the cable Ethernet® LAN interface, in concrete terms, can be used together. The configuration of the display operation device 700, other than this wireless communication processing unit 750, is the same as the third embodiment, so description thereof is omitted.

According to FIG. 7, this wireless communication processing unit 750 is included in the display operation device 700, but the system configuration in which this wireless communication processing unit 750 is disposed outside the display operation device 700 may be used. If this system configuration is used, the same general purpose computer constituting the display operation device 700 as the third embodiment is used, and the wireless LAN device and the general purpose computer are connected via a cable Ethernet® LAN or USB interface.

[4.1.3 Wireless Communication Network]

The wireless communication network 550, which is a characteristic of the fourth embodiment, is constituted by a wireless LAN, and connects the switching controllers for circuit breaker 100i to 100M and the display operation device 700 respectively, which are disposed in the local range, such as an electric station.

According to FIG. 7, the communication network is constituted only by the wireless communication network 550, but a cable communication network 500 and wireless communication network 550 may coexist via a medium converter and hub. The display operation device 700 and a part of the switching controllers for circuit breaker 100i to 100M may be connected via a cable Ethernet® LAN and the other via a wireless LAN. The fourth embodiment includes a mode in which this wireless communication network 550 is connected with a wide area network via a switching hub or a repeater, which can be connected to the wireless LAN.

By using not only the wireless communication network 550 but also a cable communication network 500, and connecting these to the wide area network, a plurality of switching controllers for circuit breaker 100i to 100M, extending over electric stations and display operation devices 700, can be interconnected. Needless to say, the switching controller for circuit breaker 100 and a display operation device 700 may be connected wirelessly one-to-one, by using the wireless communication network 550.

[4.2 Functions]

The functions of the switching control system for circuit breaker according to the fourth embodiment are the same as the third embodiment, except that the wireless communication network 550 is used, so description thereof is omitted.

[4.3 Effects]

The switching control system for circuit breaker according to the fourth embodiment described above has the following effects in addition to the effects of the first to third embodiments.

In the fourth embodiment, the switching controller for circuit breaker 100 and the display operation device 700 are connected wirelessly by using the wireless communication network 550, so there is no need for a time-consuming work of laying cable. Particularly, when the switching controller for circuit breaker is connected to a conventionally installed switching device, laying cable may be difficult in some cases, but if the invention according to the fourth embodiment is applied, a cable need not be laid, which simplifies construction of the system and decreases cost.

If the switching controller for circuit breaker 100 and the display operation device 700 are connected one-to-one using the wireless communication network 550, cable connection is unnecessary, so these devices can be easily connected, and various operations performed by the display operation device 700 become more convenient. In periodic inspection of the switching controller for circuit breaker 100 and the circuit breaker 1100, the switching controller for circuit breaker 100 and the display operation device 700 can be easily connected one-to-one at the work site, whereby such work as data collection and operation checks can be more efficient.

5. Fifth Embodiment

[5.1 Configuration]

Figure 8:
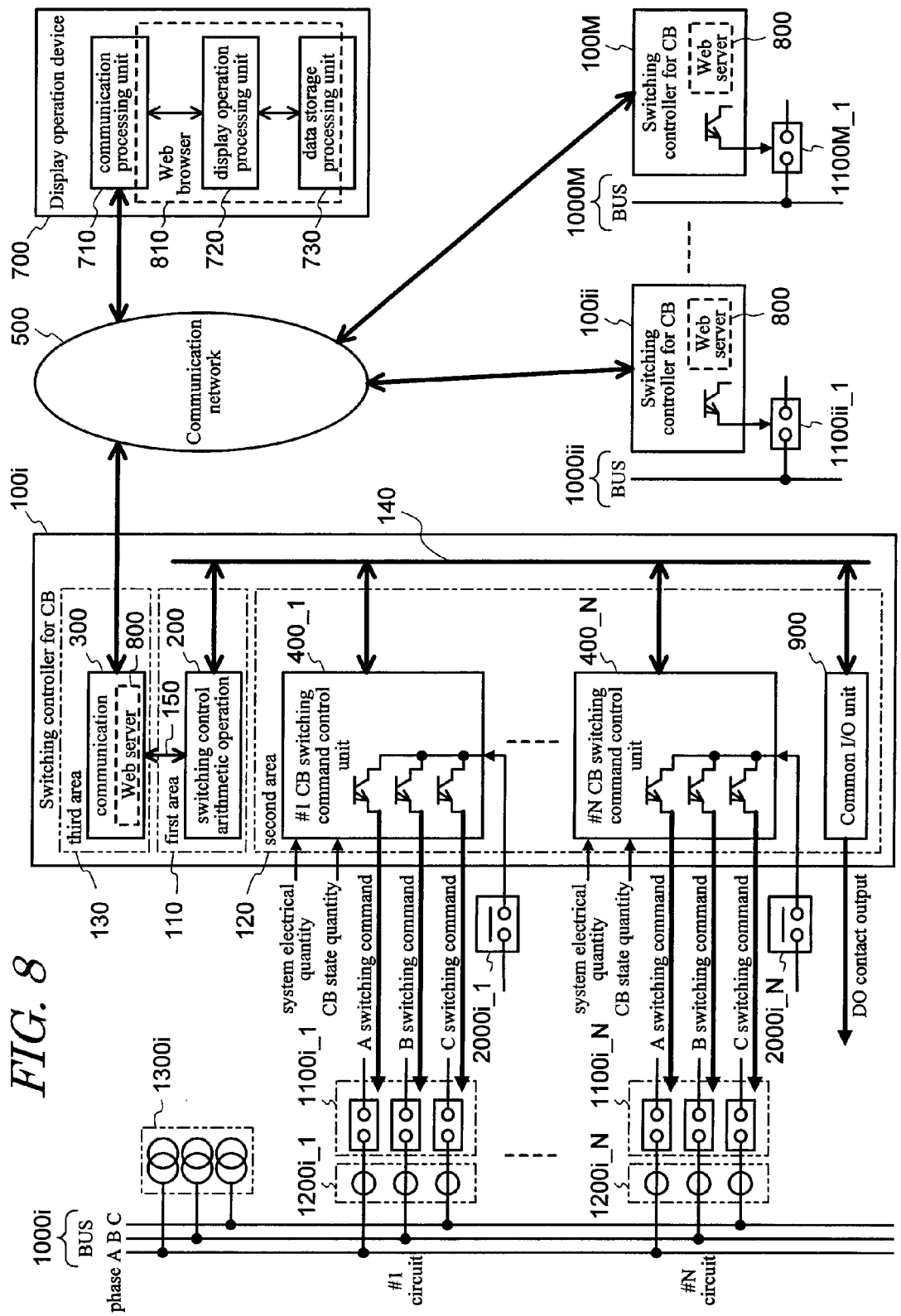
FIG. 8 is a diagram depicting a system configuration of the switching controller for circuit breaker and peripheral circuits according to the fifth embodiment of the present invention.

The configuration of a system of the switching controller for circuit breaker and peripheral circuits thereof according to the fifth embodiment of the present invention (hereafter switching control system for circuit breaker) will be described next with respect to FIG. 8. As FIG. 8 shows, the major configuration of the switching controllers for circuit breaker 100i to 100M, display operation device 700 and communication network 500 is the same as the third embodiment, so description thereof is omitted, but the characteristics of the fifth embodiment, which is different from the third embodiment, are the following aspects.

A first aspect is that according to the fifth embodiment, a web server 800 is installed in the communication arithmetic operation unit 300 of the switching controller for circuit breaker 100. This web server 800 is a piece of software having an information transmission function based on the WWW (World Wide Web), which runs on the MPU for communication arithmetic operation 310 of the communication arithmetic operation unit 300 of the switching controller for circuit breaker 100 shown in FIG. 5.

A second aspect is that according to the fifth embodiment, a web browser 810 is installed in the display operation device 700. This web browser 810 is display/operation/data display software which runs on the CPU of the display operation device 700 constituted by a general purpose computer, and acquires and displays the information sent by the web server 800. For this web browser 810, commercial web browser software, such as Internet Explorer, can be used.

A third aspect is that according to the fifth embodiment, a communication network 500, to which the Internet or intranets (TCP/IP protocols) is applied, is used. When the synchronous switching control related data and setting values/settling values are transmitted/received in the form of file between the switching controller for circuit breaker 100 and the display operation device 700, FTP and HTTP protocols can also be applied to this communication network 500. The wireless communication network 550 may be applied to the communication unit between the switching controller for circuit breaker 100 and the display operation device 700, just like the case of the fourth embodiment.

[5.2 Functions]

The functions of the switching control system for circuit breaker according to the fifth embodiment will be described next, but description on the concrete synchronous switching control operation, which is the same as the first embodiment, is omitted. Concerning the concrete data acquisition/storage operation and settling value/setting value operation in the switching control system for circuit breaker, not only functions similar to the third and fourth embodiments, but the following functions are also implemented.

Concretely according to the fifth embodiment, the MPU for communication arithmetic operation 310 of the communication arithmetic operation unit 300 of the switching controller for circuit breaker 100 executed the web server 800 housed in the communication arithmetic operation unit 300, and in the web server 800, synchronous switching control related data, such as main circuit current waveforms before and after the circuit breaker switching operation, system voltage waveforms before and after the circuit breaker switching operation, stroke waveforms of the circuit breaker, switching time of the circuit breaker and state data (e.g. operation pressure, temperature and control voltage) of the circuit breaker are stored in HTML document and XML document format.

If data acquisition is requested from the web browser 810 running on the display operation device 700, the web server 800 of the communication arithmetic operation unit 300 sends the above mentioned synchronous switching control related data to the display operation device 700 according to this request via the communication network 500 constituted by the Internet or intranets. When the synchronous switching control related data is received, the display operation device 700 displays this synchronous switching control related data on the web browser 810 in table format, for example.

In the display operation device 700, waveform data can be displayed as a graph using JavaScript® (Java® is a registered trademark), for example, so that an operator can read the synchronous switching control related data or the other data using the web browser 810 as an HMI. Needless to say, the received synchronous switching control related data may be stored in the data storage processing unit 730, which is an external storage device, such as a hard disk, using this web browser 810 as an HMI.

Also according to the fifth embodiment, the settling values/setting values in the switching controller for circuit breaker 100 are set using the web browser 810 included in the display operation device 700 as an HMI. Concretely, when a settling value/setting value is input to the web browser 810, the settling value/setting value is sent to the web server 800 of the communication arithmetic operation unit 300 of the switching controller for circuit breaker 100 via such communication networks 500 as the Internet or intranets. If a settling value/setting value is stored in the display operation device 700 in file format or the other format, this settling value/setting value can be sent to the web server 800 of the communication arithmetic operation unit 300 of the switching controller for circuit breaker 100 via the communication network 500, even if the settling value/setting value is not input to the web browser 810.

When the settling value/setting value is sent to the web server 800 of the communication arithmetic operation unit 300, the MPU for communication arithmetic operation 310, shown in FIG. 5, stores this settling value/setting value in the FROM 340. In the fifth embodiment, access may be limited by setting a password in the web server 800 in order to ensure security in accessing the network. The above mentioned functions of the web server 800 and the web browser 810 are an example, and the present invention includes other general functions of the web server and web browser.

[5.3 Effects]

The switching control system for circuit breaker according to the fifth embodiment has the following effects in addition to the effects of the first to fourth embodiments.

According to the fifth embodiment, the web server 800 is installed in the communication arithmetic operation unit 300 of the switching controller for circuit breaker 100, and the web browser 810 is installed in the display operation device 700, therefore commercial web browser software, such as Internet Explorer, can be used as HMI software of the display operation device 700.

Thereby, an operator need not install dedicated communication software and maintenance software in the display operation device 700 (e.g. computer for HMI), and the manufacturer need not provide dedicated software and maintenance software to the user on a CD-ROM or the like. Therefore, only if the operator has a personal computer where Microsoft Windows® OS (Windows® is a registered trademark) and/or Apple Mac® OS (Mac® is a registered trademark), which is/are quite popular now, and Internet Explorer are installed, is it easily connected to the switching controller for circuit breaker 100, and various operations by the operator become dramatically more convenient to execute.

6. Sixth Embodiment

[6.1 Configuration]

The configuration of a system of the switching controller for circuit breaker and peripheral circuits thereof according to the sixth embodiment of the present invention (hereafter switching control system for circuit breaker) will be described next with reference to FIG. 9.

Figure 9:
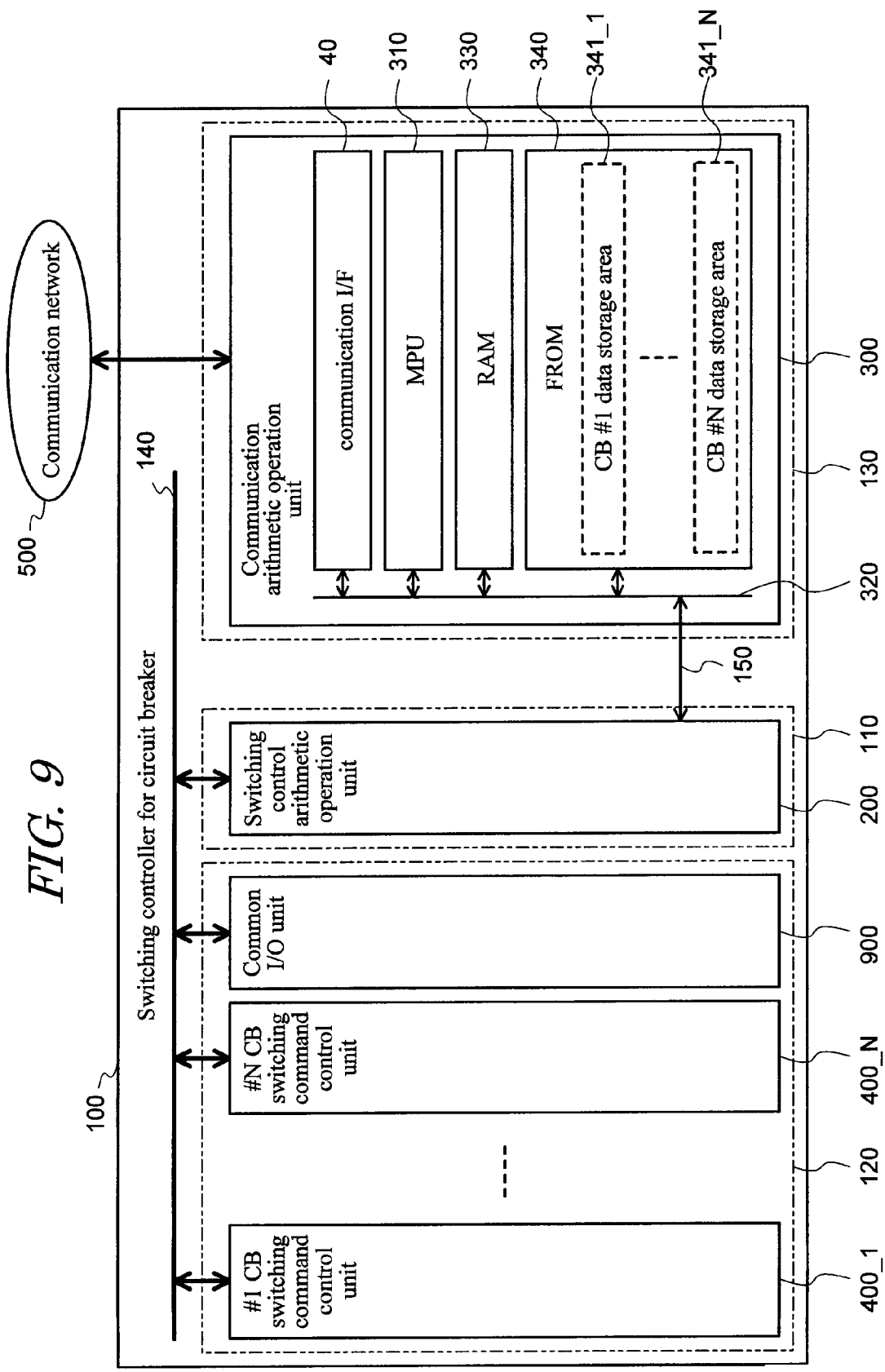
FIG. 9 is a detailed block diagram of the switching controller for circuit breaker according to the sixth embodiment of the present invention.

As shown in the detailed block diagram of the switching controller for circuit breaker 100 in FIG. 9, the configuration of the sixth embodiment is characterized in that the data storage area in FROM 340 disposed in the communication arithmetic operation unit 300 of the third area 130 is divided into a plurality of data storage areas (N areas in this case) from the data storage area for the circuit breaker 1100_1 to the data storage area for the circuit breaker 1100_N.

Concretely as FIG. 9 shows, #1 circuit breaker data storage area 341_1 (of circuit #1) in the FROM 340 is disposed as a storage area of the synchronous switching control related data for the circuit breaker 1100_1. In the same manner, in the FROM 340, #N circuit breaker data storage area 341_N (of circuit #N) is disposed as a storage area of the synchronous switching control related data for the circuit breaker 1100_N. In this way, #1 circuit breaker data storage areas 341_1 to #N circuit breaker data storage area 341_N are disposed corresponding to the circuit breaker 1100_1 to circuit breaker 1100_N.

In the #1 circuit breaker data storage area 341_1 to #N circuit breaker data storage area 341_N disposed in the FROM 340, a memory size which is different depending on the operation frequency and degree of importance of the circuit breaker 1100 may be allocated respectively. For example, a large memory size is allocated to a data storage area 341_X (X: any of 1 to N) of the circuit breaker 1100_X (X: any of 1 to N), of which operation frequency and degree of importance are high.

According to the sixth embodiment, a plurality of storage areas (N or more areas) of settling value/setting value, where the settling value/setting value storage area to be set in the switching controller for circuit breaker 100 is divided into an area for the circuit breaker 1100_1 to the area for circuit breaker 1100_N in the FROM 340, may be disposed.

According to the sixth embodiment, the above mentioned data storage areas may be disposed on a non-volatile memory other than the FROM 340.

In the sixth embodiment, the configuration other than the above mentioned FROM 340 is the same as the second to fifth embodiments, so description thereof is omitted.

[6.2 Functions]

The functions of the switching control system for circuit breaker according to the sixth embodiment will be described next. A concrete synchronous switching control operation, however, is the same as the first embodiment, so description thereof is omitted. Concrete data acquisition/storage operation, and the settling value or setting operation according to this switching control system for circuit breaker, have the following functions in addition to functions similar to the second to fifth embodiments.

According to the sixth embodiment, if the synchronous switching control of the circuit breaker 1100 is executed, the MPU for communication arithmetic operation 310 of the communication arithmetic operation unit 300 of the third area 130 classifies the synchronous switching control related data transferred from the switching control arithmetic operation unit 200 of the first area 110 for each corresponding control target circuit breaker 1100, and stores the data in the FROM 340.

In concrete terms for example, if the synchronous switching control is performed for the circuit breaker 1100_X (X: any of 1 to N) of circuit #X, the switching control arithmetic operation unit 200 of the first area 110 attaches a recognition flag of the circuit breaker 1100_X of circuit #X to the synchronous switching control related data, and transfers it to the MPU for communication arithmetic operation 310. Referring to the recognition flag of the circuit breaker 1100_X of the circuit #X attached to the synchronous switching control related data, the MPU for communication arithmetic operation 310 stores this data in the #X circuit breaker data storage area 341_X (of circuit #X) of the FROM 340.

If the switching controller for circuit breaker 100 received a data transmission request from the display operation device 700 via the communication network 500, the MPU for communication arithmetic operation 310 of the third area 130 sends the requested synchronous switching control related data of the circuit breaker to the display operation device 700. For example, if the synchronous switching control data of the circuit breaker 1100_X of circuit #X is requested, the MPU for communication arithmetic operation 310 reads data stored in the #X circuit breaker data storage area 341_X of the FROM 340, and sends this data to the display operation device 700 via the communication network 500.

[6.3 Effects]

The switching control system for circuit breaker according to the sixth embodiment has the following effects in addition to the effects of the second to fifth embodiments.

According to the switching controller for circuit breaker 100 of the sixth embodiment, the data storage area is divided into an area for the circuit breaker 1100_1 of circuit #1 to an area for the circuit breaker 1100_N of circuit #N in the FROM 340 of the communication arithmetic operation unit 300, so even if a circuit breaker 1100 of which operation frequency is high operates many times, overwriting and discarding the synchronous switching control related data of a circuit breaker 1100 of which operation frequency is low can be prevented.

Therefore, when the synchronous switching control related data is stored in the FROM 340 of which storage capacity of the data storage area is limited, a conventional problem of old data being overwritten and discarded by new data, exceeding the storage capacity of the data storage area, can be solved. In other words, if the data storage area is different from the sixth embodiment and shared by the circuit breaker 1100_1 of circuit #1 to the circuit breaker 1100_N of circuit #N, the synchronous switching control related data of the circuit breaker, of which operation frequency is high, overwrites the synchronous switching control related data of the circuit breaker of which operation frequency is low. On the other hand, according to the sixth embodiment, in which the data storage area is divided, the synchronous switching control related data of the circuit breaker of which operation frequency is low can also be stored in the FROM 340, just like the circuit breaker of which operation frequency is high.

As a result of using the sixth embodiment, a large memory size in the storage area of the FROM 340 can be allocated to a circuit breaker of which operation frequency is high and a circuit breaker of which degree of importance is high, so flexible data management according to the operation can be implemented.

7. Seventh Embodiment

[7.1 Configuration]

The configuration of a system of the switching controller for circuit breaker and peripheral circuits thereof according to the seventh embodiment of the present invention (hereafter switching control system for circuit breaker) will be described next. The seventh embodiment is characterized in that the switching controller for circuit breaker is constructed such that a substrate corresponding to the switching command control unit 400, to be installed in the second area 120 of the switching controller for circuit breaker 100, can be added later. The other configuration, which is the same as the first to sixth embodiments, is denoted with the same reference symbols, and description thereof is omitted.

Concretely, the maximum number M of circuit breakers that the switching controller for circuit breaker 100 can support is predetermined, and the installation space for this number of substrates is secured in the switching controller for circuit breaker 100. Therefore, if N number of substrates corresponding to the switching command control units 400 have already been installed, open slots to install (M−N) number of substrates are available in the switching controller for circuit breaker 100.

The switching controller for circuit breaker 100 has a substrate count setting unit, which is not illustrated, for storing as a setting value, a number of actually installed substrates corresponding to the switching command control units 400, and if the number of corresponding circuit breakers 1100 is N at that moment, the actually installed number of substrates corresponding to the switching command control units 400 is also N, so N is stored as the setting value. When a number of substrates changes, the substrate count setting unit for storing the number of substrates as the setting value has a function to re-register the number of substrates after the change within the range not exceeding the maximum number of circuit breakers that can be supported.

[7.2 Functions]

The functions of the switching controller for circuit breaker 100 according to the seventh embodiment will be described next. The synchronous switching control operation of the switching controller for circuit breaker 100 according to the seventh embodiment has the following functions in addition to the same functions as the first embodiment. Description on the steps common to the first embodiment is omitted.

In the seventh embodiment, it is assumed that a maximum number of circuit breakers, that the switching controller for circuit breaker 100 can support, is M, and the switching controller for circuit breaker 100 has a space to install this number (M) of substrates. It is also assumed that a number N of installed substrates corresponding to the switching command control unit 400 is stored in the switching controller for circuit breaker 100 as a setting value.

If A number of substrates corresponding to the switching command control units 400 are added to the open slots of the switching controller for circuit breaker 100, the substrate count setting unit changes the setting value of the number of installed substrates to (N+A). Here (N+A) is assumed to be less than or equal to M, which is the maximum setting value that can be supported. Referring to this setting value (N+A), the switching control arithmetic operation unit 200 of the first area 110 executes normal switching control arithmetic operation for the circuit breaker 1100_1 of circuit #1 to the circuit breaker 1100_(N+A) of circuit #(N+A). In other words, referring to this setting value (N+A), the switching command control units 400_1 to 400_(N+A), corresponding to the (N+A) number of circuit breakers 1100, operate. The subsequent part of switching control operation is the same as the first embodiment.

[7.3 Effects]

The switching controller for circuit breaker 100 according to the seventh embodiment described above has the following effects, in addition to the effects of the first to sixth embodiments.

In the seventh embodiment, even when a circuit, that is a circuit breaker, is added later during construction of an electric station, for example, one or more substrate(s) corresponding to the switching command control unit(s) 400 for the circuit breaker to be added can be inserted into the same number of open slot(s) of the switching controller for circuit breaker 100, and the setting value of the number of installed substrates can be changed, so circuit breakers can be easily added. In other words, without resorting to the method of prior art where the switching controller for circuit breaker is added accordingly when a circuit breaker is added, any number of switching control unit(s) for circuit breaker can be additionally installed within one switching controller for all circuit breakers with minimum construction very economically.

Even for an already installed circuit breaker 1100 to which the switching controller for circuit breaker 100 is not applied, the switching controller for circuit breaker 100 can be easily and additionally applied later. In this case as well, the switching controller for circuit breaker can be additionally installed with minimum construction very economically, without requiring a new installation space.

8. Eighth Embodiment

[8.1 Configuration]

The configuration of a system of the switching controller for circuit breaker and peripheral circuits thereof according to the eighth embodiment of the present invention (hereafter switching control system for circuit breaker) will be described with reference to FIG. 10.

Figure 10:
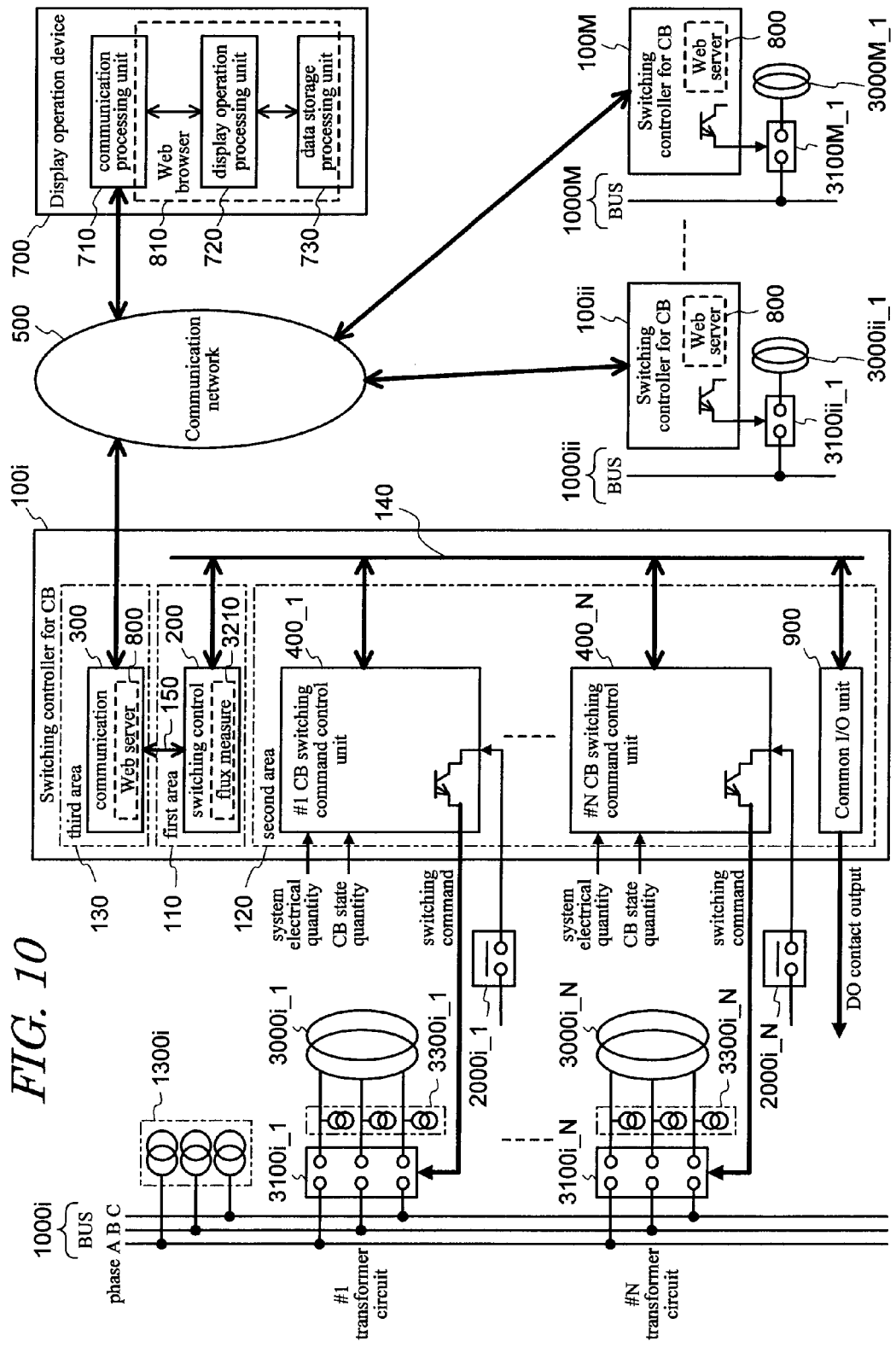
FIG. 10 is a diagram depicting a system configuration of the switching controller for circuit breaker and peripheral circuits according to the eighth embodiment of the present invention.

As FIG. 10 shows, 100i to 100M denote switching controllers for circuit breaker, 700 denotes a display operation device, and 500 denotes a communication network. The configuration of the display operation device 700 and the communication network 500 according to the eighth embodiment is the same as the fifth embodiment, so description thereof is omitted.

[8.1.1 Configuration of Main Circuits]

1000*i* to 1000M are main circuits, which are constituted of a bus, transformer circuit #1 to transformer circuit #N, and other power transmission circuits and phase modifier circuits which are not illustrated. 3000*i*_1 to 3000M_N denote a transformer of transformer circuit #1 to transformer circuit #N, respectively, and 3100*i*_1 to 3100M_N denote a non-phase segregated operation-type circuit breaker (hereafter simply circuit breaker unless otherwise specified) of transformer circuit #1 to transformer circuit #N, respectively.

3300*i*_1 to 3300M_N denote voltage transformers to measure 3 phases of transformer terminal voltage of transformer circuit #1 to transformer circuit #N respectively, and 1300 denotes a voltage transformer for phases connected to a bus, just like the first to seventh embodiments.

A disconnector, ground switch, current transformer or the like are omitted, but it is assumed that general apparatuses constituting a switching device of an electric station are connected to the main circuits 1000*i* to 1000M. The main circuits 1000*i* to 1000M may be different main circuits in a same electric circuits (e.g. a plurality of main circuits in different voltage classes, 2 main circuits with a different bus in a same voltage class) or different main circuits in different electric stations. The present invention concerns the operating and functioning of a 3-phase main circuit 1000, and hereafter the target of the present invention is assumed to be a 3-phase main circuit 1000, unless otherwise specified.

2000*i*_1 to 2000M_N denote a superordinate device of transformer circuit #1 to transformer circuit #N, respectively, such as a protective relay device and BCU (Bay Control Unit).

The suffixes i to M attached to the transformer 3000, non-phase segregated operation-type circuit breaker 3100, voltage transformer to measure transformer terminal voltage 3300, and superordinate device 2000 correspond to the characters of different main circuits 1000*i* to 1000M, and are omitted herein below unless necessary. The suffixes _1 to _N attached to the transformer 3000, non-phase segregated operation-type circuit breaker 3100, voltage transformer to measure transformer terminal voltage 3300 and superordinate device 2000 correspond to transformer circuit #1 to transformer circuit #N, and this explanation is omitted herein below unless necessary.

[8.1.2 Configuration of Switching Controller for Circuit Breaker]

Major components of the switching controller for circuit breaker 100 according to the eighth embodiment will be described next with reference to FIG. 10 and FIG. 11. The switching controller for circuit breaker 100 is constituted of a first area 110 which performs switching control arithmetic operation to open or close a non-phase segregated operation-type circuit breaker 3100 in a desired phase of the system voltage from the transformer 1300 or the main circuit 1000, a second area 120 which outputs a delay-controlled opening command signal or delay-controlled closing command signal to the non-phase segregated operation-type circuit breaker 3100 based on the switching control arithmetic operation result of the first area 110, and a third area 130 which transmits/receives information to/from a display operation device 700 via the communication network 500, and transmits/receives information to/from the first area 110.

The entity of the first area 110 of the switching controller for circuit breaker 100 is a switching control arithmetic operation unit 200, which is a substrate of which components are an MPU (microprocessor) for switching control arithmetic operation and a memory, and has a configuration similar to the fifth embodiment. The eighth embodiment, however, has the following difference from the fifth embodiment, which is a characteristic of the eighth embodiment. Components the same as the fifth embodiment are denoted with the same reference symbols, and description thereof is omitted.

Figure 11:
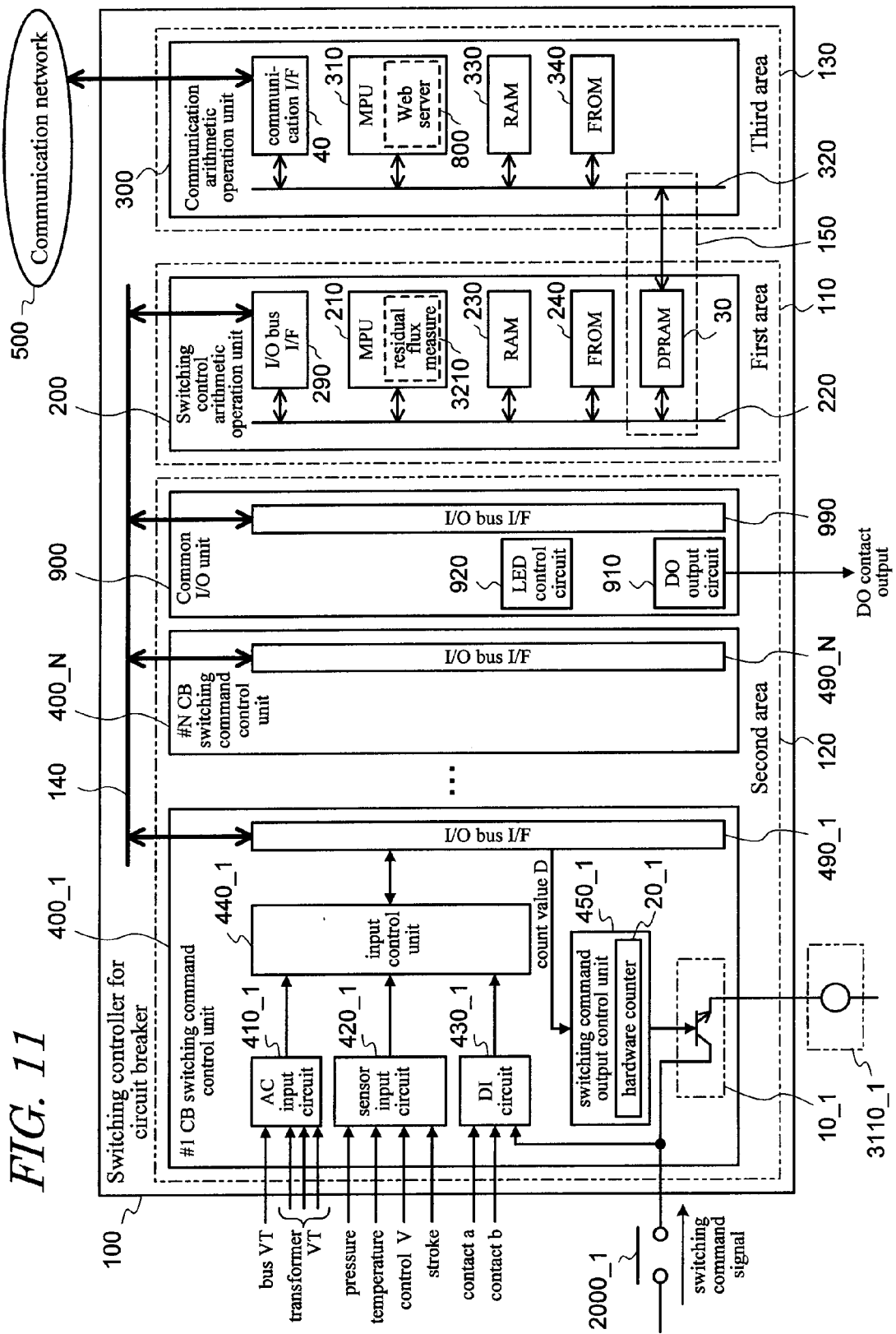
FIG. 11 is a detailed block diagram of the switching controller for circuit breaker according to the eighth embodiment of the present invention.

As FIG. 10 and FIG. 11 show, according to the eighth embodiment, a residual magnetic flux measuring unit 3210 is installed in the MPU (microprocessor) for switching control arithmetic operation 210 of the switching control arithmetic operation unit 200 of the first area 110. The residual magnetic flux measuring unit 3210 in particular is constituted by a piece of software which runs on the MPU for switching control arithmetic operation 210, and 3 phases of transformer residual magnetic flux is calculated by digitally integrating the 3-phase transformer terminal voltage from the voltage transformer of transformer side 3300.

The entity of the second area 120 of the switching controller for circuit breaker 100 is N number of switching command control units 400_1 to 400_N, each of which is a substrate constituted of an AC input circuit, sensor input circuit, DI (Digital Input) circuit and switching command output unit, and a common input/output unit 900, which is a substrate constituted of input/output circuits commonly used for each circuit, such as DO (Digital contact Output) for a failure alarm, which is mostly the same as the fifth embodiment, but the eighth embodiment is different from the fifth embodiment in terms of the following aspects, which are characteristics of the eighth embodiment. The components the same as the fifth embodiment are denoted with the same reference numbers, and description thereof is omitted.

According to the eighth embodiment, 1 phase of the bus side voltage from the voltage transformer of bus side 1300 and 3 phases of transformer terminal voltage from the voltage transformer of transformer side 3300 are input to the AC input circuit 410 in the switching command control unit 400 of the second area 120, as shown in FIG. 10 and FIG. 11.

The switching command output unit 10 of the switching command control unit 400 of the second area 120 outputs one quantity unit to one non-phase segregated operation-type circuit breaker 3100, as shown in FIG. 11, considering that the target circuit breaker is a non-phase segregated operation-type circuit breaker 3100. Therefore, as shown in FIG. 11, it is sufficient to provide one semiconductor switch, installed in each substrate corresponding to the switching command control unit 400_1 to 400_N, to support each substrate (that is, one semiconductor switch is provided to one circuit breaker).

The configuration of the third area 130 according to the eighth embodiment, which is the same as the fifth embodiment, is denoted with the same reference symbols, and description thereof is omitted.

[8.2 Functions]

The functions of the switching controller for circuit breaker 100 according to the eighth embodiment will be described next. Since the major functions of the synchronous switching control operation are the same as the first to seventh embodiments, only the differences will be described below. Concrete data acquisition/storage operation and the settling value/setting value operation in this switching controller for circuit breaker 100 are the same as the second to seventh embodiments, so description thereof is omitted.

[8.2.1 Residual Magnetic Flux Measurement Operation]

A first difference of the eighth embodiment from the first to seventh embodiments is that the residual magnetic flux measurement function is provided. The switching controller for circuit breaker 100 according to the eighth embodiment, of which control target is a non-phase segregated operation-type circuit breaker for transformer circuit 3100, has a residual magnetic flux measuring function for measuring the residual magnetic flux of the voltage transformer of transformer side 3300 when this voltage transformer is electrically disconnected from the main circuit 1000.

Concretely, the residual magnetic flux measurement function of the switching controller for circuit breaker 100 is implemented by the digital computing function of the residual magnetic flux measuring unit 3210 installed in the MPU (microprocessor) for switching control arithmetic operation 210 of the switching command control unit 400 of the first area 110. Particularly, this residual magnetic flux measuring unit 3210 calculates the 3-phase transformer residual magnetic flux by measuring the 3-phase transformer terminal voltage from the voltage transformer of transformer side 3300, and digitally integrating the 3-phase transformer terminal voltage after electrically disconnecting the transformer.

The transformer residual magnetic flux is computed individually for all the transformers connected to the control target non-phase segregated operation-type circuit breaker 3100. The transformer residual magnetic flux measured by the residual magnetic flux measuring unit 3210 is calculated using the following expression, for example.

$$\Phi(t) = -\int v_{transformer}(t) dt + \phi_r \qquad \text{[Expression 3]}$$

where $\Phi(t)$ denotes transformer magnetic flux, $V_{transformer}(t)$ denotes transformer terminal voltage, and $\phi r$ denotes residual magnetic flux.

As [Expression 3] shows, the transformer residual magnetic flux is determined by integrating the transformer terminal voltage, and any algorithm can be applied to the integration algorithm to digitally integrate the transformer terminal voltage.

[8.2.2 Switching Control Operation of Circuit Breaker]

A second difference of the eighth embodiment from the first to seventh embodiments is that the control target is a non-phase segregated operation-type circuit breaker. Concretely the switching controller for circuit breaker 100 of the eighth embodiment performs the following switching control arithmetic operation for the non-phase segregated operation-type circuit breaker as a control target.

The MPU (microprocessor) for switching control arithmetic operation 210 in the switching control arithmetic operation unit 200 of the first area 110 calculates one quantity unit of synchronous delay count values D_1 to D_N for the non-phase segregated operation-type circuit breaker 3100_1 to the non-phase segregated operation-type circuit breaker 3100_N, respectively, based on the timing of the zero crosspoint of 1 phase of bus side voltage. The hardware counter 20_X in the switching command output control unit 450_X of the switching command control unit 400_X (X: any of 1 to N) corresponding to each circuit breaker 3100 counts one quantity unit of synchronous delay count value D_X, and turns ON the semiconductor switch of the switching command output unit 10_X at a predetermined timing.

Since the control target is the circuit breaker 3100 for transformer circuits, the target closing phase for synchronous closing control in the switching control arithmetic operation is calculated based on the transformer residual magnetic flux calculated by the residual magnetic flux measuring unit 3210.

The other switching control operation of circuit breaker is the same as the first to seventh embodiments.

[8.3 Effects]

The switching controller for circuit breaker 100 according to the eighth embodiment described above has the following effects, in addition to the effects of the first to seventh embodiments.

According to the eighth embodiment, of which control target is a non-phase segregated operation-type circuit breaker 3100 for transformer circuits, the circuit breaker can be easily applied even if a non-phase segregated operation-type circuit breaker is used in a lower branch system, such as a power distribution system, and if the application target is limited to transformer circuits in a lower branch system, such as a power distribution system, a more economical synchronous switching controller can be installed with less space.

9. Ninth Embodiment

[9.1 Configuration]

Figure 12:
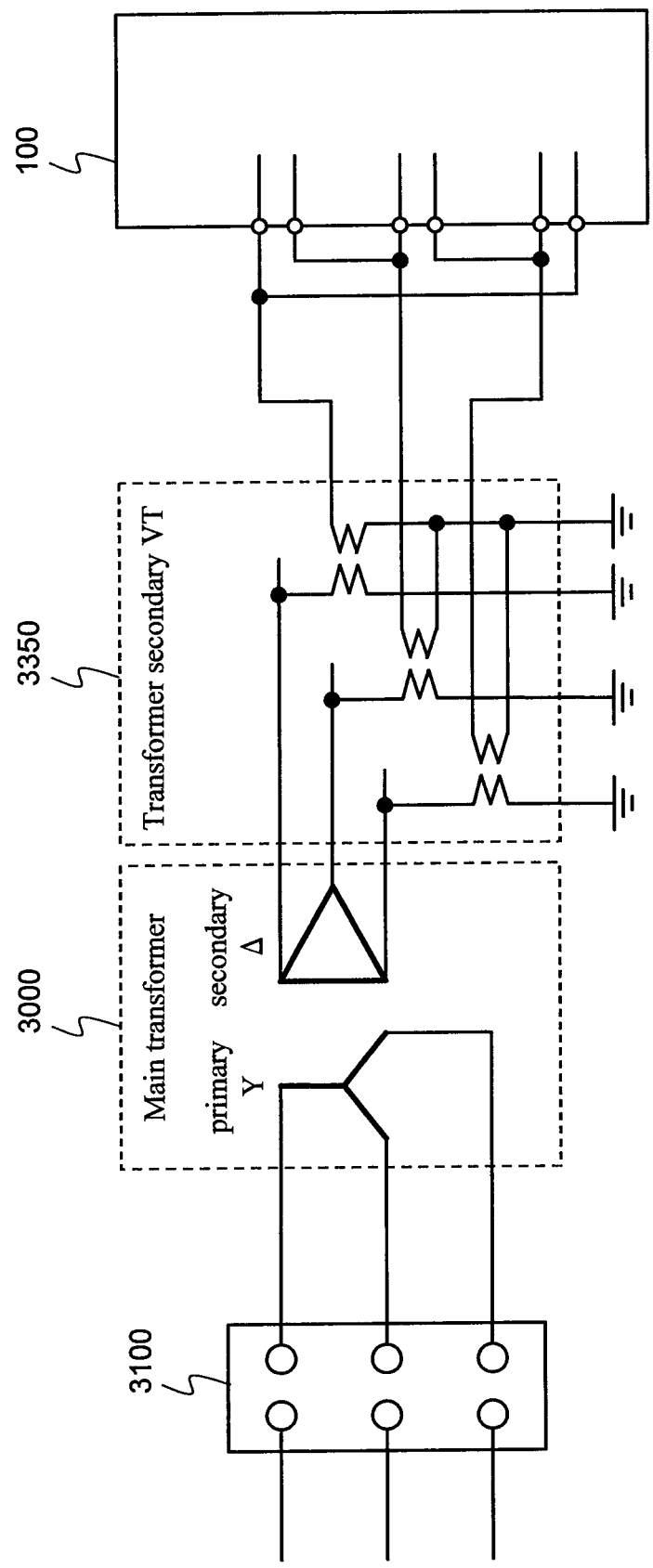
FIG. 12 is a diagram depicting an input connection method of a voltage transformer of transformer side of the switching controller for circuit breaker according to the ninth embodiment.

The configuration of a system of the switching controller for circuit breaker and peripheral circuits thereof according to the ninth embodiment of the present invention (hereafter switching control system for circuit breaker) will be described next with reference to FIG. 12. As FIG. 12 shows, the characteristic of the ninth embodiment is a voltage transformer of transformer side 3350, which is connected to the switching controller for circuit breaker 100 by a specific method. The other configuration, which is the same as the eighth embodiment, is denoted with the same reference symbols, and description thereof is omitted.

As FIG. 12 shows, the transformer 3000 used here has a Y connection at the primary side, and a Δ connection at the secondary side. According to the ninth embodiment, the non-phase segregated operation-type circuit breaker 3100 is connected to the primary side of the transformer 3000, and the voltage transformer of transformer side 3350 is connected to the secondary side of the transformer 3000. Therefore, the output of the voltage transformer of transformer side 3350 connected to the secondary side of the transformer 3000 is input to the switching controller for circuit breaker 100.

In other words, as FIG. 12 shows, the voltage transformer of transformer side 3350 connected to the secondary side of the transformer 3000 is connected to the switching controller 100 of the circuit breaker 3100 such that the output of this voltage transformer of transformer side 3350 is Δ–Y converted.

[9.2 Functions]

The functions of the switching controller for circuit breaker 100 according to the ninth embodiment will be described next. The major functions of the ninth embodiment are the same as the eighth embodiment, but the difference from the eight embodiment is the input mode of the voltage of the transformer 3000, based on which the residual magnetic flux of the transformer 3000 is calculated, therefore, the function of this aspect will be described below. Description of the functions the same as the eighth embodiment is omitted.

The switching controller for circuit breaker 100 according to the ninth embodiment, of which control target is the non-phase segregated operation-type circuit breaker for transformer circuit 3100, also measures the residual magnetic flux of the transformer 3000, just like the eighth embodiment. Therefore, when the voltage transformer of transformer side 3350 measures the residual magnetic flux of the transformer 3000, the transformer terminal voltage at the primary side of the transformer 3000 must be measured.

As FIG. 12 shows, the secondary side voltage of the transformer 3000 is directly output to the voltage transformer of transformer side 3350, but the voltage transformer of transformer side 3350 is connected to the switching controller for circuit breaker 100 such that the output is Δ–Y converted, so the transformer voltage to be input to this switching controller for circuit breaker 100 corresponds to the primary side voltage of the transformer 3000.

Hence, the residual magnetic flux measuring unit 3210 installed in the MPU for switching control arithmetic operation 210 of the switching control arithmetic operation unit 200 calculates the residual magnetic flux by directly integrating the input voltage of the transformer 3000.

[9.3 Effects]

The switching controller for circuit breaker 100 according to the ninth embodiment described above has the following effects, in addition to the effects of the eight embodiment.

According to the ninth embodiment, the voltage transformer of transformer side 3350 connected to the secondary side of the transformer 3000 is connected to the switching controller 100 of the circuit breaker 3100 such that the output of the voltage transformer of transformer side 3350 is Δ–Y converted, so the Δ–Y conversion operation processing in the switching controller for circuit breaker 100, to receive the primary side terminal voltage from the secondary side terminal voltage of the transformer 3000, can be omitted.

Hence, such problems as high load to the MPU for switching control arithmetic operation 210 when a Δ–Y conversion operation is performed, as the internal processing of the switching controller for circuit breaker 100, and the requirements of a high performance MPU, can be solved. Even if the output voltage of the voltage transformer of transformer side 3350 connected to the secondary side of the transformer 3000 is used, the residual magnetic flux of the transformer 3000 can be easily measured.

The invention claimed is:

1. A switching controller for a plurality of circuit breakers, to which at least one of electrical quantities of the system voltage and main circuit current, state quantity of the circuit breakers, and at least one of an opening command signal and closing command signal for the circuit breakers, are input, and which, at a desired phase of the system voltage or main circuit current, controls the opening command signal to open one or more of the circuit breakers, or controls the closing command signal to close one or more of the circuit breakers, comprising:

a first area which performs arithmetic operations, when the opening/closing command signal of each circuit breaker has been input, to determine an individual synchronous closing delay time for the closing command signal or an individual synchronous opening delay time for the opening command signal at the desired phase of the system voltage or main circuit current;

a second area which controls delay of the closing command signal based on the synchronous closing delay time, or controls delay of the opening command signal based on the synchronous opening delay time when the opening/closing command signal has been determined by the first area, and outputs each of these delay-controlled opening/closing command signals to each corresponding circuit breaker; and a third area, which is a communication unit for communicating with a display operation device which displays and stores synchronous switching control related data including main circuit current waveforms and system voltage waveforms before and after the switching operation of the circuit breaker, stroke waveforms of the circuit breaker, switching operation time of the circuit breaker and state quantity of the circuit breaker, wherein:

the second area has plural switching command control units which control delay of the opening command signal or closing command signal, and the number of the switching command control units is the same as that of the circuit breakers to be controlled, and the second area has one input/output unit common to the switching command control units, and the input/output unit includes a digital output circuit for failure alarm contact, an LED control circuit for an LED to indicate power ON and an LED to indicate a failure alarm.

2. The switching controller for circuit breaker according to claim 1, wherein:

the first area and second area are connected via a parallel transmission medium.

3. The switching controller for circuit breaker according to claim 1, wherein:

the third area has a data storage unit in which the synchronous switching control related data is stored, and the data storage unit is divided into a plurality of parts according to the number of the circuit breakers.

4. The switching controller for circuit breaker according to claim 1, wherein:

the circuit breakers are non-phase segregated operation-type circuit breakers.

5. A switching control system for circuit breaker, which is configured by individually connecting a plurality of the switching controllers for circuit breaker described in claim 1, with the display operation device via a communication network.

6. The switching control system for circuit breaker according to claim 5, wherein:

a wireless communication unit is provided in at least one of the switching controller for circuit breaker and the display operation device, and a part or all of the communication network is a wireless communication network.

7. The switching control system for circuit breaker according to claim 5, wherein:

the third area has a web server which accumulates synchronous switching control related data, and the display operation device has a web browser which displays the synchronous switching control related data when the data has been acquired via the communication network.

* * * * *